US011441800B2

(12) United States Patent
Rowswell et al.

(10) Patent No.: US 11,441,800 B2
(45) Date of Patent: Sep. 13, 2022

(54) AUTONOMOUS MACHINE LEARNING DIAGONOSTIC SYSTEM WITH SIMPLIFIED SENSORS FOR HOME APPLIANCES

(71) Applicant: FPL Smart Services, LLC, Juno Beach, FL (US)

(72) Inventors: Brent B. Rowswell, Loxahatchee, FL (US); Raymond C. Dickenson, Jupiter, FL (US)

(73) Assignee: FPL Smart Services, LLC, Juno Beach, FL (US)

( * ) Notice: Subject to any disclaimer, the term of this patent is extended or adjusted under 35 U.S.C. 154(b) by 347 days.

(21) Appl. No.: 16/736,152

(22) Filed: Jan. 7, 2020

(65) Prior Publication Data
US 2021/0207827 A1  Jul. 8, 2021

(51) Int. Cl.
*F24F 11/30* (2018.01)
*F24F 11/56* (2018.01)
(Continued)

(52) U.S. Cl.
CPC .............. *F24F 11/30* (2018.01); *F24F 11/56* (2018.01); *F24F 11/80* (2018.01); *G06N 20/00* (2019.01);
(Continued)

(58) Field of Classification Search
CPC ........ F24F 11/30; F24F 11/56; F24F 2110/10; F24F 11/80; G06N 20/00; H04W 4/38
See application file for complete search history.

(56) References Cited

U.S. PATENT DOCUMENTS 3,957,200 A   5/1976 Young
5,291,748 A   3/1994 Ueda
(Continued)

FOREIGN PATENT DOCUMENTS

EP    0044623      1/1982
WO    2019035142   2/2019

OTHER PUBLICATIONS

F. Zamora-Martinez, et al., On-line learning of indoor temperature forecasting models towards energy efficienct, Energy & Buildings (2014), httpp://dx.doi org/10.1016/j.enbuild.2014.04 034.
(Continued)

*Primary Examiner* — Elias Desta
(74) *Attorney, Agent, or Firm* — Fleit Intellectual Property Law; Jon Gibbons

(57) ABSTRACT

Disclosed is a system and method for remote performance monitoring of a ventilation system. The method is independent of measuring electric meter current consumed or thermostatic data. The method uses two sensors to measure temperature and humidity. A first sensor is placed on a return grille, and a second sensor is placed on the supply grille. Using only data from the sensors, an on-off duty cycle is calculated. The on-off duty cycle is calculated for an on-time period during which the ventilation system is operating and an off-time period during which the ventilation system is not operating between the air as measured by the first sensor and the air as measured by the second sensor on the supply air grille. Machine learning with two or more datasets of the sensor data and the on-off duty cycle to indicate a component of the ventilation system is faulty.

20 Claims, 21 Drawing Sheets

(51) Int. Cl.
*F24F 11/80* (2018.01)
*G06N 20/00* (2019.01)
*H04W 4/38* (2018.01)
*F24F 110/20* (2018.01)
*F24F 110/10* (2018.01)

(52) U.S. Cl.
CPC .......... *H04W 4/38* (2018.02); *F24F 2110/10* (2018.01); *F24F 2110/20* (2018.01)

(56) References Cited

U.S. PATENT DOCUMENTS

| | | | |
|---|---|---|---|
| 5,372,015 | A | 12/1994 | Suzuki et al. |
| 5,799,496 | A | 9/1998 | Park et al. |
| 6,133,555 | A | 10/2000 | Brenn |
| 6,373,033 | B1 | 4/2002 | De et al. |
| 6,390,380 | B2 | 5/2002 | Ichishi et al. |
| 6,621,239 | B1 | 9/2003 | Belliveau |
| 6,726,113 | B2 | 4/2004 | Guo |
| 7,963,453 | B2 | 6/2011 | Peterson et al. |
| 7,971,450 | B2 | 7/2011 | Furlanetto et al. |
| 8,249,731 | B2 | 8/2012 | Tran et al. |
| 8,733,349 | B2 | 5/2014 | Bath et al. |
| 9,477,240 | B2 | 10/2016 | Musunur et al. |
| 9,811,102 | B2 | 11/2017 | Gulli' et al. |
| 9,857,810 | B2 | 1/2018 | Smith, Jr. |
| 9,921,590 | B2 | 3/2018 | Lindelof et al. |
| 10,094,588 | B2 | 10/2018 | Keogh |
| 11,243,002 | B2 * | 2/2022 | Reeder ................. G05B 19/048 |
| 2008/0234869 | A1 * | 9/2008 | Yonezawa ................. F24F 11/30 236/49.3 |
| 2015/0362207 | A1 * | 12/2015 | Abiprojo ................. F24F 11/62 702/183 |
| 2018/0295187 | A1 | 10/2018 | Sabata et al. |
| 2019/0075687 | A1 | 3/2019 | Brunstetter |
| 2019/0078833 | A1 | 3/2019 | Graziano |
| 2019/0086276 | A1 | 3/2019 | Delgoshaei et al. |

OTHER PUBLICATIONS

Wu, Leon et al. (2012). Improving efficiency and reliability of building systems using machine learning and automated online evaluation. 10.1109/LISAT.2012.6223192.

Wall, Josh et al. A Dynamic Machine Learning-based Technique for Automated Fault Detection in HVAC Systems, ASHRAE Transactions (vol. 117, Issue 2), 2011.

Yun, J., & Won, K. H. (2012). Building environment analysis based on temperature and humidity for smart energy systems. Sensors (Basel, Switzerland), 12(10), 13458-13470. doi:10.3390/s121013458.

Moreno, M.V., Dufour, L., Skarmeta, A.F et al. Big data: the key to energy efficiency in smart buildings. Soft Comput 20, 1749-1762 (2016), pp. 1749-1762.

Candanedo I.S., et al. (2018) Machine Learning Predictive Model for Industry 4.0.: 13th International Conference, KMO 2018, Zilina, Slovakia, Aug. 6-10, 2018 .

Dehestani, Davood & Eftekhari, Fahimeh & Guo, Ying & Ling, S. H. & Su, Steven. (2011). Online Support Vector Machine Application for Model Based Fault Detection and Isolation of HVAC System. International Journal of Machine Learning and Computing. 1. 66-72. 10.7763/IJMLC.2011.V1.10.

* cited by examiner

US 11,441,800 B2

AUTONOMOUS MACHINE LEARNING DIAGONOSTIC SYSTEM WITH SIMPLIFIED SENSORS FOR HOME APPLIANCES

FIELD OF THE DISCLOSURE

The present invention relates to the field of monitoring performance of appliances. More specifically, the present invention relates to monitoring the detailed energy usage of an electrical device, such as a home appliance, in a network of electrical devices such as in a home or business office from a single point in the network.

BACKGROUND

The components of certain appliances, such as air conditioners, electric water heaters, and refrigerators are subject to wear. Components may fail which cause the appliance to stop operating.

Sometimes the identification of the nature of the faulty component by a service person is not immediate. The service person many times must check multiple components of the appliance in order to identify exactly the instant when such a malfunction occurs. Once the malfunction is identified this helps to uncover the origin of the problem.

Remote monitoring solutions for appliances include purchasing web-enable appliances that communicate back status to a centralized facility. However, requiring purchase of new appliances and systems that monitor themselves can be cost prohibitive. Moreover, this solution leaves out the majority of today's appliances that are not web-enabled.

Another remote monitoring solution has been to read electrical characteristics from smart electrical meters and disaggregate meters using machine learning/artificial intelligence to identify when major appliances are consuming electricity. The goal of this technology is to determine what percentage of load is due to AC, water heater, electric vehicles, etc. from aggregate smart meter data. The challenge with this approach is not all homes have smart meter technology and non-power providers may not have access to the smart meter data.

SUMMARY OF THE INVENTION

A system, a method, and a computer program product for remote performance monitoring of a ventilation system is described. The method begins with accessing first sensor data from a first sensor placed on a return air grill for measuring a return temperature and a return humidity of air going into a return of a ventilation system for heating, cooling or a combination thereof. In addition, data from a second sensor placed on a supply air grill for measuring a supply temperature and a supply humidity of air coming out of the ventilation system is accessed. Next an on-off duty cycle of an is determined by an on-time period during which the ventilation system is operating to change a temperature, humidity, or combination thereof, between the air as measured by the first sensor on the return air grill and the air as measured by the second sensor on the supply air grill. The on-off duty cycle is also determined by an off-time period during which the ventilation system is not operating to change a temperature, humidity, or combination thereof, between the air as measured by the first sensor on the return air grill and the air as measured by the second sensor on the supply air grill. Deriving this on-off duty cycle is referred to as the first training set. In one example, the on-off duty is determined independent of data from an electric meter measuring current consumed by the ventilation system. In another example, the on-off duty is independent of data from a ventilation thermostat, which controls the ventilation system.

The method for the remote performance monitoring of a ventilation system continues with creating a first training set of the off-duty cycle. A machine learning algorithm is trained with the first training set. A second training set is created. The second training set includes return temperature, return humidity, supply temperature, supply humidity during each the on-off duty cycle. The machine learning algorithm is trained with the second training set.

Based on the machine learning algorithms, the method for the remote performance monitoring of a ventilation system autonomously performs diagnostics that indicates or predicts a component of the ventilation system is faulty, such as a compressor, a blower, a refrigerant charge, a drain line float switch, a filter, and a heating element.

In another example, the method for the remote performance monitoring of the ventilation system includes accessing outside air temperature data and outside air relative humidity corresponding to a geographic location in which the ventilation system is operating; and wherein the creating the second training set includes the outside air temperature data and the outside air relative humidity data.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
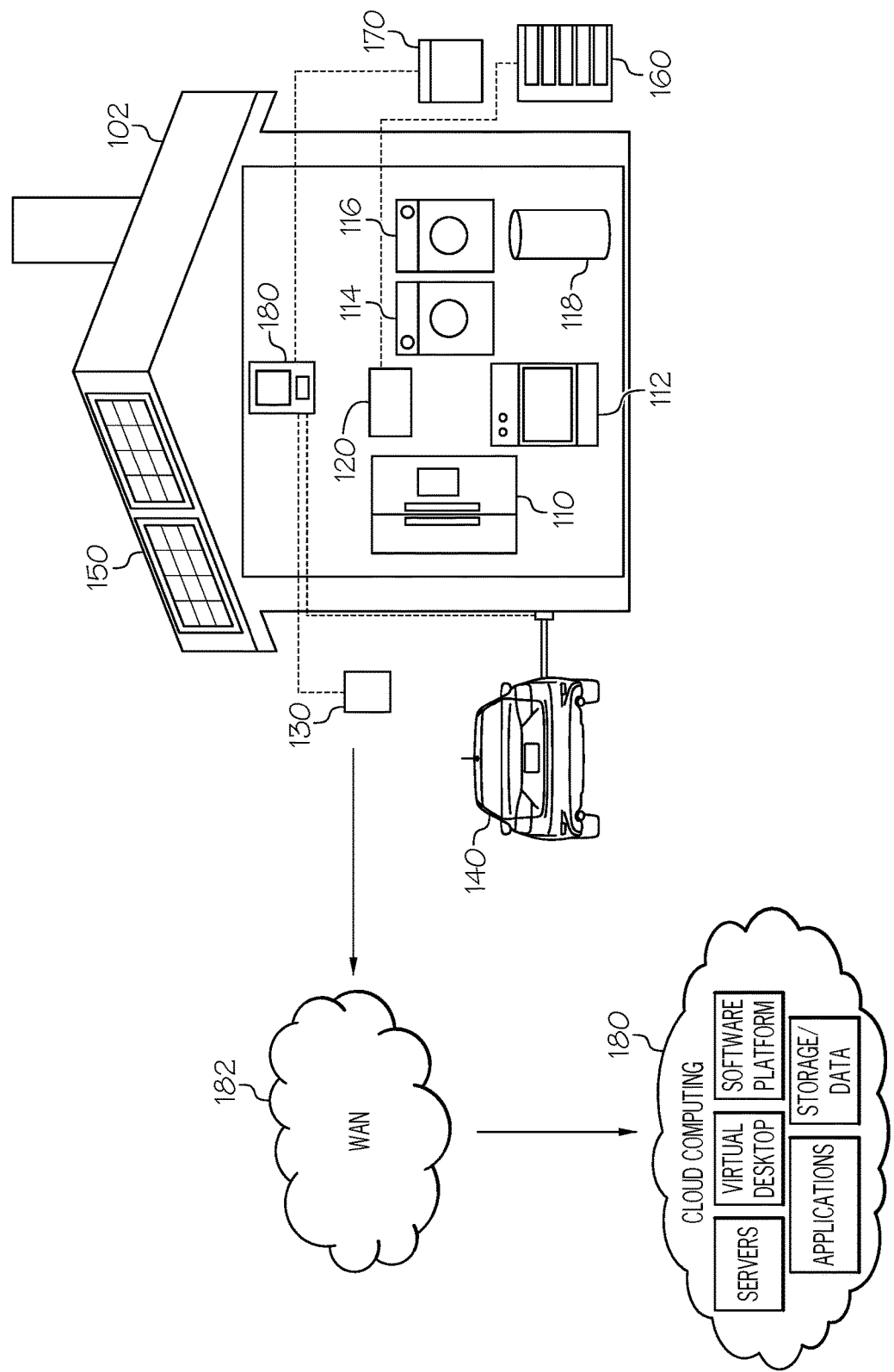
FIG. 1 illustrates a typical home with one or more appliances wirelessly communicating to a gateway, which is connected back to a centralized server, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.
Non-Limiting Definitions The term "appliance" is any equipment used to perform a specified task including air conditioning, heating, refrigeration, clothes washer, clothes dryer, electric hot water heater, range, pool pump, sprinkler pump, electric vehicle charging system, photovoltaic charging system and more.

The term "HVAC " is heating, ventilation, and air conditioning.

The term "machine learning" refers to the use of algorithms and statistical models bycomputer systems use to perform a specific task without using explicit instructions, relying on patterns and inference instead.

The term "model parameters" refers to the parameters in a machine learning model. Model parameters are learned from training data.

The term "training data" is another term for model parameters.

The term "ventilation system" is the "V" in HVAC. Ventilation systems prevents stagnation of interior spaces by exchanging air in any space to provide high indoor air quality which involves temperature control, oxygen replenishment, and removal of moisture, odors, smoke, heat, dust, airborne bacteria, carbon dioxide, and other gases.

The term "wireless gateway" is router or other a device that performs the functions of a router and includes the functions of a wireless access point. It is used to provide access to the Internet.

The term "wireless temperature and humidity sensor" is a compact sensor that measures temperature and humidity and communicates over a wireless network back to a gateway.
Overview Unlike the prior art systems that rely on reading information from smart electric meters or reading information from smart thermostats, the presently claimed invention remotely monitors performance of a ventilation system using only two temperature/humidity sensors which are installable by the customer without any special training or tools.

The invention provides wireless temperature and humidity sensors that a consumer can install themselves on a HVAC system, refrigerator and hot water heater. Once installed, these sensors will forward measurements wirelessly to a residential gateway in the home. The residential gateway is connected to a cloud service where the data is collected, stored and analyzed using machine learning algorithms.

The invention leanings "what is normal" by monitoring home appliances in good working condition. Once the normal operating range is capture, analytics is used to detect departures from that norm. If any of the home appliances do start performing poorly, the system captures data used to detect similar poor performance in other homes.

Unlike other applicant monitoring system, this invention is autonomous in that it does not use and does not rely on reading any information from electrical systems or smart meters and does not use any information from smart thermostats (e.g. Nest smart thermostat). Further, unlike most industrial HVAC monitoring systems the present invention does not require instrumentation of motors, and blowers.

In contrast, for home appliances such as refrigerators and HVAC systems, the present invention only requires one wireless sensor for refrigerators and two wireless sensors for HVAC for supplying information of a computer system that autonomously perform diagnostics and fault detection on the home appliances. Each of the sensors measures temperature and humidity. These wireless sensors can be installed by a lay person or non-professional with no training.
Wireless Network FIG. 1 illustrates a typical home 102 with one or more appliances wirelessly communicating to a gateway 182 connected back to a centralized server 180, according to an example. The appliances include a refrigerator 110, a range 112, a clothes washer 114, clothes dryer 116, and a hot water heater 118. An optional smart thermostat 120 is shown.

Shown external to the home 102 is an optional pump 130 for sprinklers or pool or irrigation, an optional plug-in electric vehicle 140, and optional photovoltaic solar panels 150.

Figure 2:
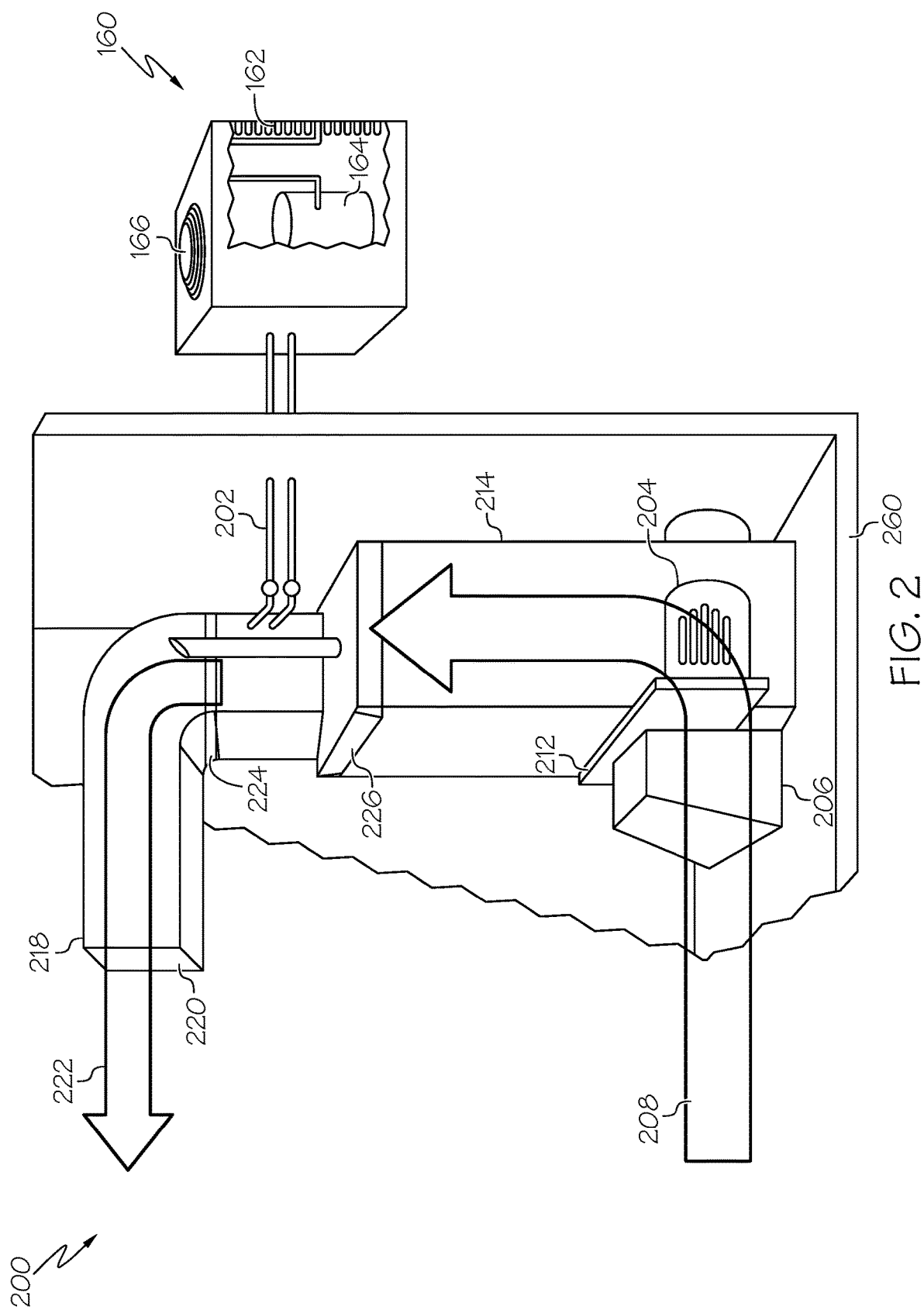
FIG. 2 are the major components of an indoor unit/air handler and an outside unit for an air conditioning system of FIG. 1, according to an example.

Also shown is an external to the home 102 is an outside unit 160 for air conditioning or ventilation system 200 as shown in FIG. 2, an optional storage battery 170 for the photovoltaic solar panels 150.

Although the example in the present invention focus specifically on the remote simplified monitoring of ventilation systems 200 of FIG. 2 and refrigerator 110, the true scope and spirit of the present invention can be expanded to other appliances and devices. For example each of the items, including the optional items shown 110 through 118, 120, 130-160 may have sensors (not shown) that communicate wirelessly with the gateway 180.

Also shown is an outside unit 160 for air conditioning and an outside battery 170 for storage of power generated by the photovoltaic solar panels 150.

HVAC System

FIG. 2 are the major components of an indoor unit or air handler 260 and an outside unit 160 for a split air conditioning system 200 of FIG. 1, according to an example. The refrigeration cycle contains four major components: the condenser coil 162, compressor 164, expansion device (not shown), and evaporator 216. The compressor 164 is widely considered the engine of the refrigeration cycle; it consumes the most power out of the HVAC system's components and forces the refrigerant through the system. Major components of the outside unit 160 are a condenser coil 162, a compressor 162, and a fan 166. These are the major components and other components including electrical components are well known in the outside unit 160.

In a split system 200 of FIG. 2, the compressor 162 condenses and circulates the refrigerant through the refrigerant filled tubing 202 from the outdoor unit 160, changing it from a gas to a liquid. The liquid is forced through the indoor evaporator coil 216 of the indoor unit 200. The indoor unit's blower 204 circulates the warm moist air 208 through the return air duct 206 to pass across in the air handler unit 214 containing the evaporator coil 224. The evaporator's coil 224 exchanges the thermal energy with the air around it. A filter 212 is typically located before the blower 204 and evaporator coils 224 to keep dirt off. There, the refrigerant turns from liquid into vapor, removing any heat from the surrounding air. As the heat is removed from the air, the air is dried and cooled 222 and blown back into the house 102 through supply duct 218 and vent 220. A resistive heat coil 226 is also shown to provide heating in addition to cooling.

From that point, the condenser 162 of outdoor unit 160 then turns the refrigerant vapor back into a liquid, removing any heat. By the time the fluid leaves the evaporator 216 again, it is a cool, low-pressure gas, eventually returning to the condenser to begin its trip all over again. This process continues repeats until the home 102 reaches the cooling temperature programmed and sensed by the setting on the thermostat 120.

Typical points of failure for a ventilation system include the compressor 164, the blower 204, a refrigerant charge in lines 202 (not shown), a drain line float switch (not shown), the filter 212, and the heating element 224.

Placement of Sensors in HVAC System

Figure 3A:
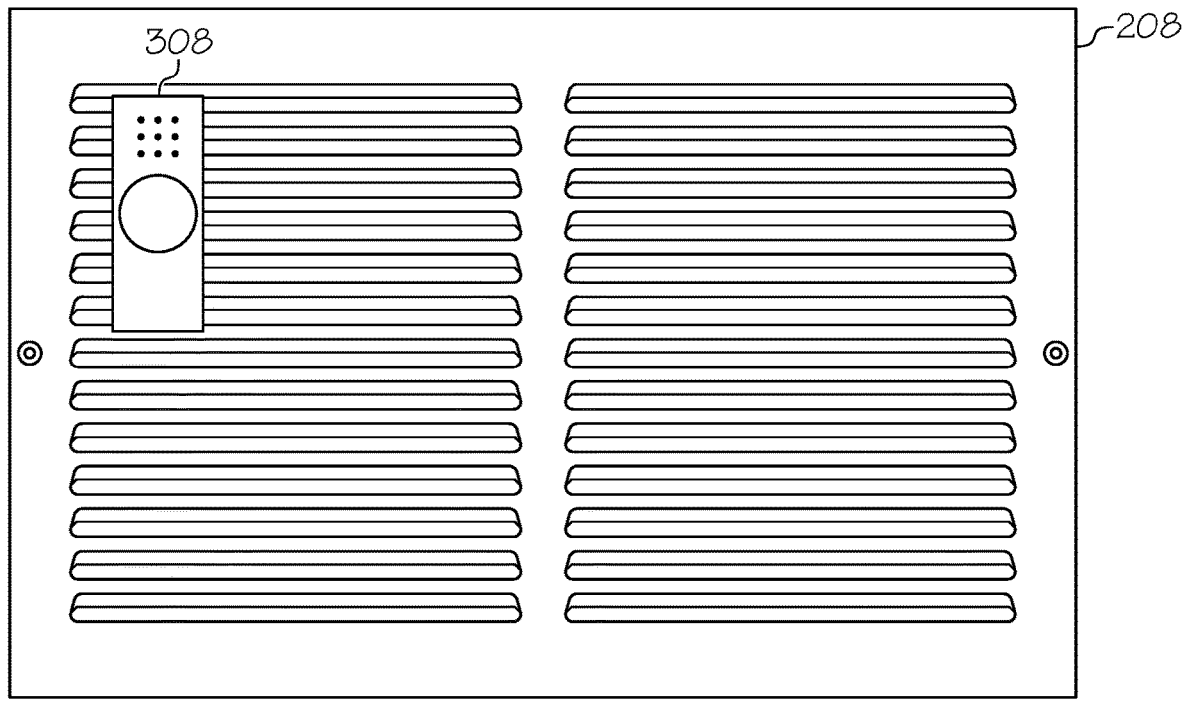
FIG. 3A is an air return vent of an HVAC system with placement of wireless temperature and humidity sensor and FIG. 3B is an air supply vent of the HVAC system wireless temperature and humidity sensor according to an example.
Figure 3B:
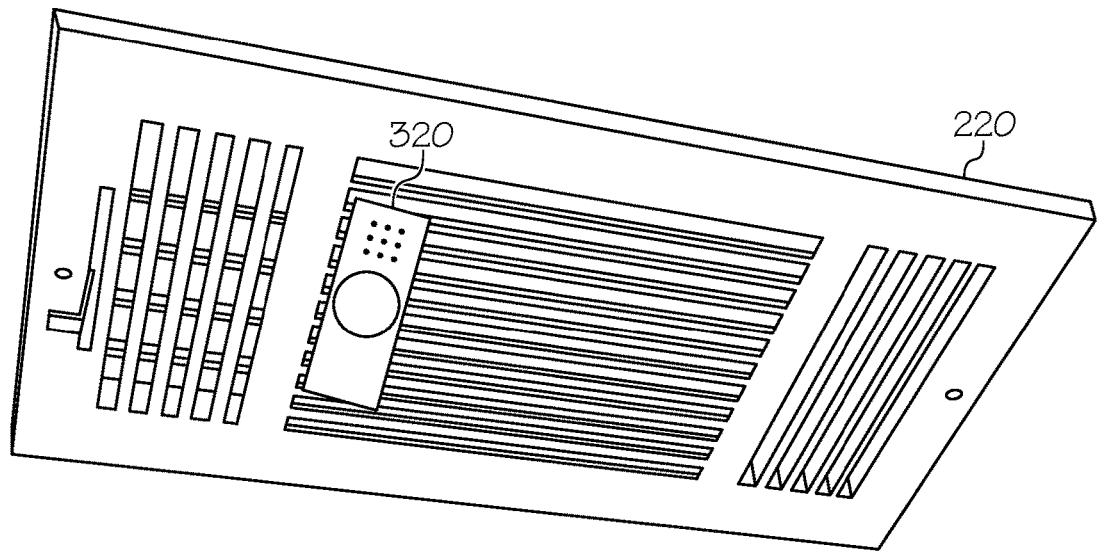

FIG. 3A is an air return vent 208 of an HVAC system with placement of wireless temperature and humidity sensor 308 and FIG. 3B is an air supply vent 220 of the HVAC system with placement of wireless temperature and humidity sensor 320 according to an example. In this example for the simplified remote monitoring of the HVAC system 160 in FIG. 2 only requires two wireless temperature and humidity sensors. Examples of wireless temperature and humidity sensors 308, 320 that have been used successfully include "Linkhigh International Limited Temperature & Humidity Sensor" and "Xiaomi Aqara Smart Air Pressure Temperature Humidity Environment Sensor". Other wireless sensors are also possible within the true scope and spirit of the present invention.

As shown in the following diagram, the present invention is measuring these two areas in the case of cooling:

1. Return air grill wireless temperature and humidity sensor 308: Warm, moist air going into the return duct to be cooled; and
2. Supply air grill wireless temperature and humidity sensors 320: Cool, dry air coming out of a vent of the air handler. The closest vent to the air handler is the most desirable.

Likewise, the present invention is measuring these two areas in the case of heating:

1. Return air grill wireless temperature and humidity sensors 308: Cool, moist air going into the return duct to be warmed; and
2. Supply air grill wireless temperature and humidity sensors: Warm, dry air coming out of the closest vent 320 to the air handler.

Each of these sensors 308 and 320 are positioned to vents closest to the air handler 260. These wireless temperature and humidity sensors 308, 320 can be placed on vanes using clips, adhesives or magnets to secure to the vent or just inside the vent, which may require removal and reinstallation of the vent.

The gateway 180 or router may be installed using a website or app that reads information such as a bar code or QR code from the physical device. The wireless temperature and humidity sensors can be paired as well-known in the industry.

Derived HVAC Cooling Cycle

Figure 4:
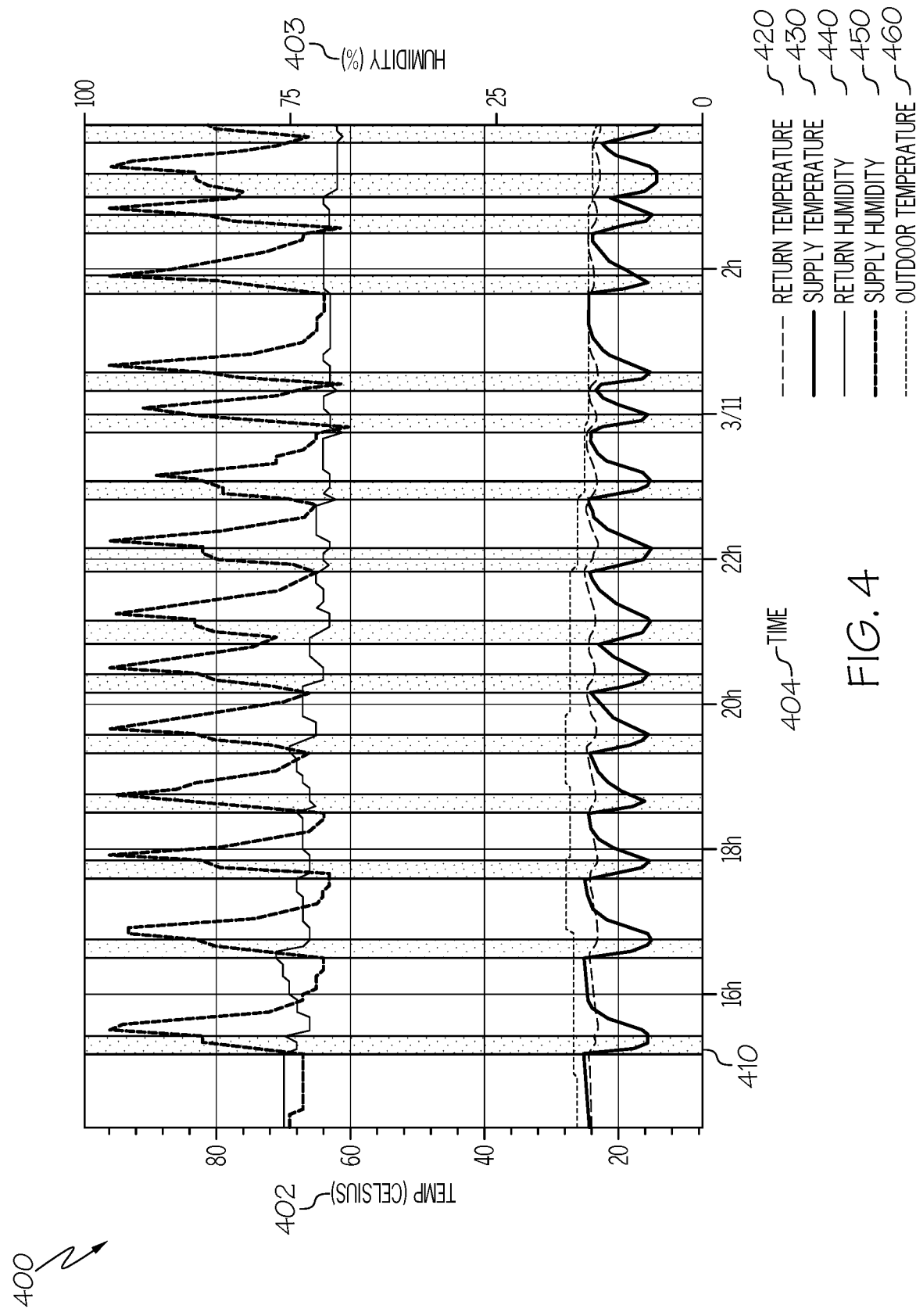
FIG. 4 is a graph illustrating remote derivation of HVAC system cooling cycle using the sensors placed in FIGS. 3A and 3B.

A cooling cycle or cooling duty cycle is when a compressor in an HVAC is running or "ON". FIG. 4 is a graph 400 illustrating remote derivation of HVAC system cooling cycle using the wireless temperature and humidity sensors placed in FIG. 3A and 3B. Shown is temperature in degrees Celsius on the vertical or Y-axis 402, a second vertical axis or Y-axis for relative humidity 403, and time in hours on the horizontal or X-axis 404. Shown are measured values from each of the return grill wireless temperature and humidity sensor 308 and supply grill wireless temperature and humidity sensor 320 from FIG. 3. More specifically the measured values from the return grill wireless temperature and humidity sensor 308 are return temperature 420 and return humidity 440. The measure values from the supply grill wireless temperature and humidity sensor 320 are supply temperature 430 and supply humidity 450. The outdoor temperature 460 of the location of the HVAC system 200 being analyze is accessed through one of a variety of methods or a combination of methods. On method is a simple outdoor wireless sensor at the location (not shown). Another method is to access a database of weather information for a specific geographic area. This database may be free government data, such as information from the US National Weather Service or a paid subscription database from many providers such as Open Weather Map.

Using a combination the measured values 420, 430, 440, 450, and 460, the periods of time when the compressor 164 is running or in an "ON" state is remotely derived by analyzing these measured values. The procedure for deriving this HVAC cooling duty cycle is further described below.

HVAC System Failed Compressor Example

Figure 5:
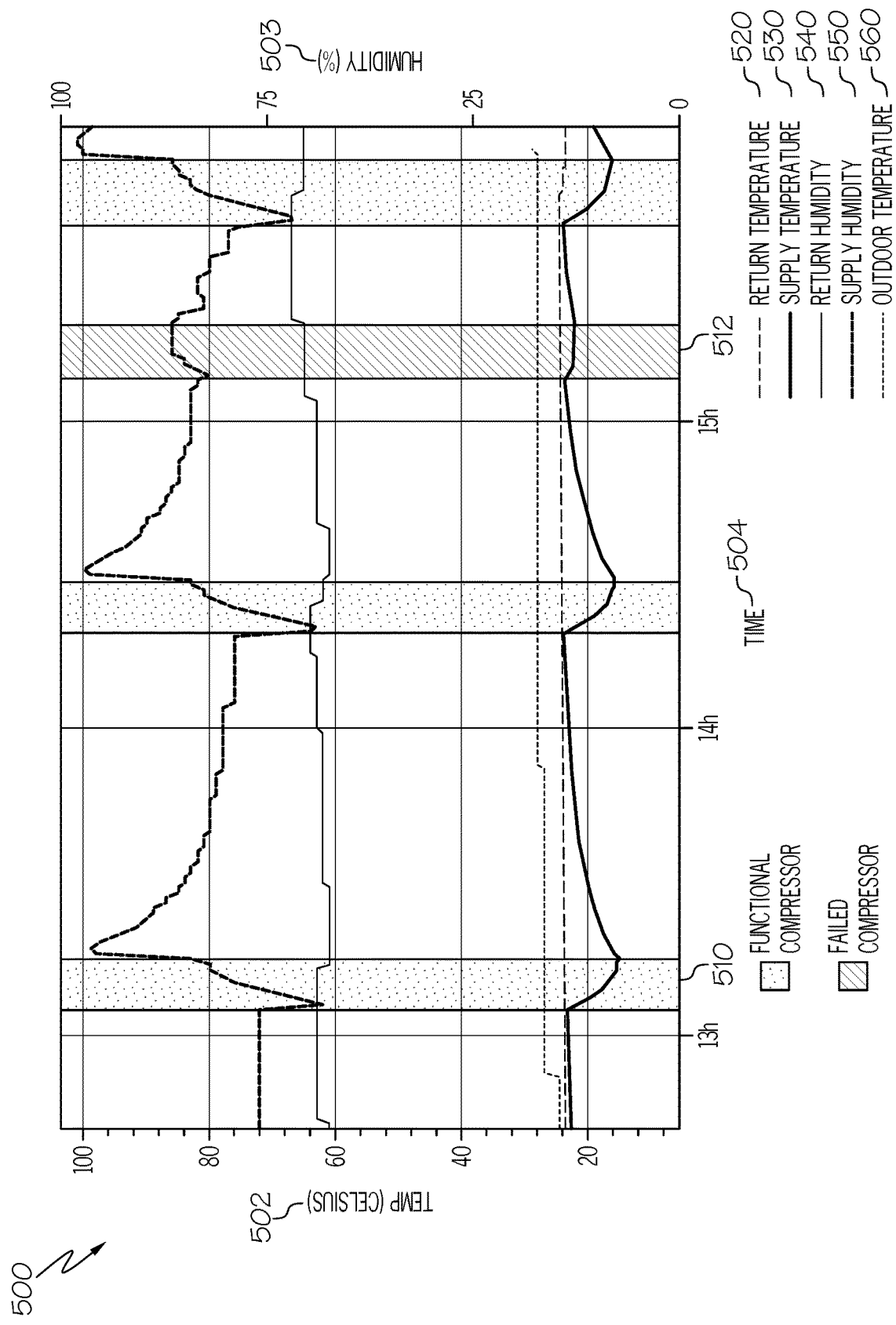
FIG. 5 is a graph illustrating remote detection of a failure of the outdoor unit of the HVAC system according to an example.

FIG. 5 is a graph 500 illustrating remote detection of a failure of the outdoor unit 160 of the HVAC system derived using the wireless temperature and humidity sensors placed in FIG. 3A and 3B. Shown is temperature in degrees Celsius on the vertical or Y-axis 502, a second vertical axis or Y-axis for relative humidity 503, and time in hours on the horizontal or X-axis 504. Shown are measured values humidity temperature 520, return humidity 540, supply temperature 530 and supply humidity 550 from each of the return grill wireless temperature and humidity sensor 308 and wireless temperature and humidity supply grill sensor 320 from FIG. 3. Also the outdoor temperature 560 where the HVAC unit is located is also shown.

Using a combination the measured values 520, 530, 540, 550, and 560, the periods of time 510 when the compressor 164 is running correctly. This corresponds to the cooling duty cycle 410 shown in FIG. 4. Note that a failed compressor 164 is also derived using a combination the measured values 520, 530, 540, 550, and 560 along with the supervised machine learning flow as described in FIG. 16A, FIG. 16B, and FIG. 16C below. The periods of time when the compressor 164 should be running or in an "ON" state is determined. Also during the time when the compressor 164 should be "ON" the supply humidity 550 and supply temperature 530 is relatively flat and the supply humidity 550 is rising and is remotely derived by analyzing these measured values.

HVAC Improper Filter Placement

Figure 6:
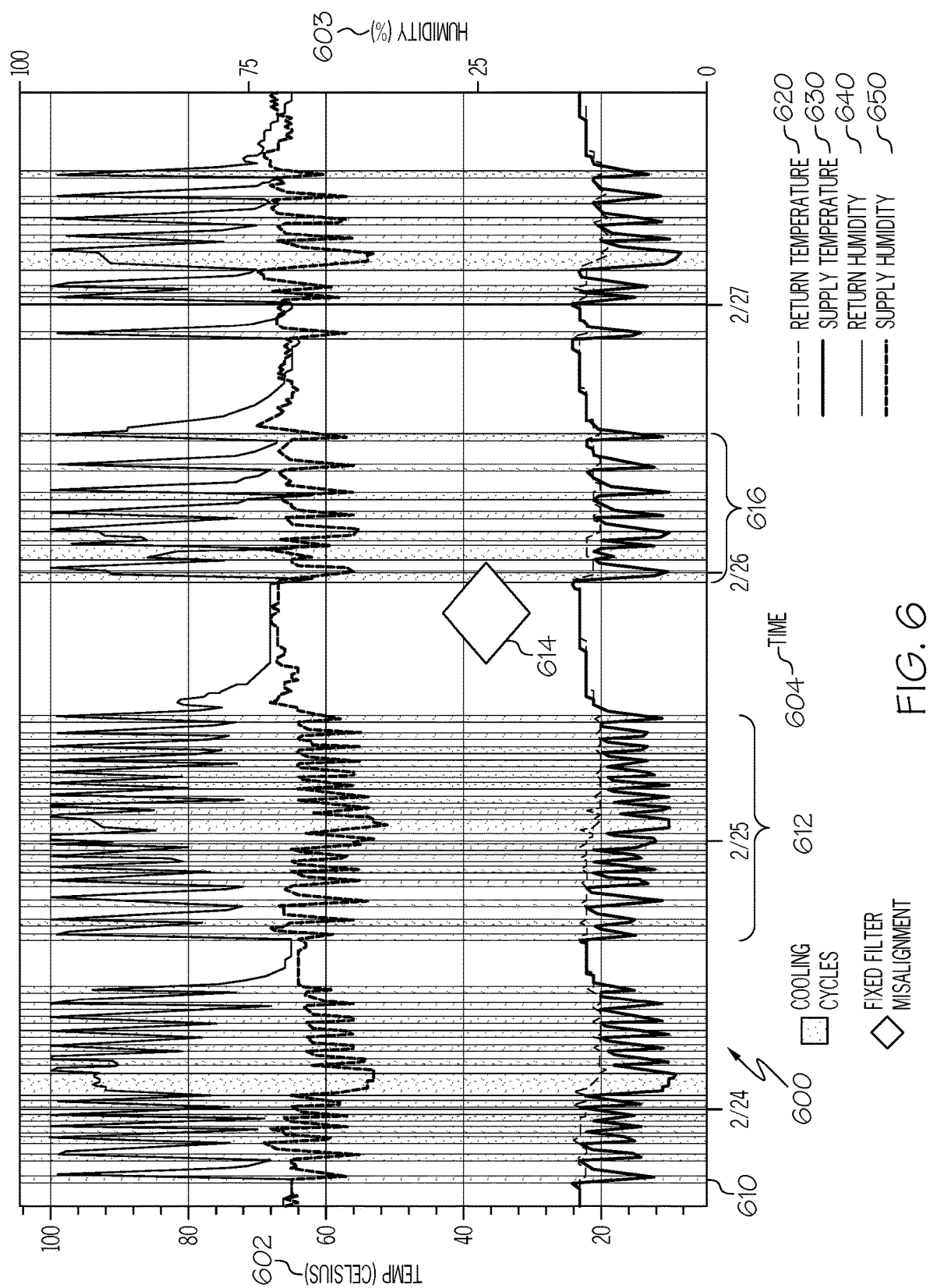
FIG. 6 is a graph illustrating remote detection of bad filter placement in the HVAC system according to an example.

FIG. 6 is a graph 600 illustrating remote detection of a bad filter placement in the HVA system 200 derived using the sensors placed in FIG. 3A and 3B along with the supervised machine learning flow as described in FIG. 16A, FIG. 16B, and FIG. 16C below. Shown is temperature in degrees Celsius on the vertical or Y-axis 502, a second vertical axis or Y-axis for relative humidity 503, and time in hours on the horizontal or X-axis 504. Shown are measured values humidity temperature 620, return humidity 640, supply temperature 630 and supply humidity 650 from each of the return grill wireless temperature and humidity sensor 308 and supply grill wireless temperature and humidity sensor 320 from FIG. 3.

Using a combination the measured values 620, 630, 640, and 650, the periods of time 610 when the compressor 164 is running or "ON". This corresponds to the cooling duty cycle 410 shown in FIG. 4. Note a frequency of when the compressor 164 is "ON" is very high, which based on history is abnormal. The system determined the filter 224 may be touching the evaporator coil 216 making the filter wet and raising the return side humidity 640 raise abnormally fast using a combination the measured values 620, 630, 640, and 650. Note by remotely identifying this misaligned filter the cooling duty cycle frequency reduced by 50%. This decrease in operating the compressor 160 in turn extends the life of the HVAC system 200.

HVAC Aggregate Training Data

Figure 7C:
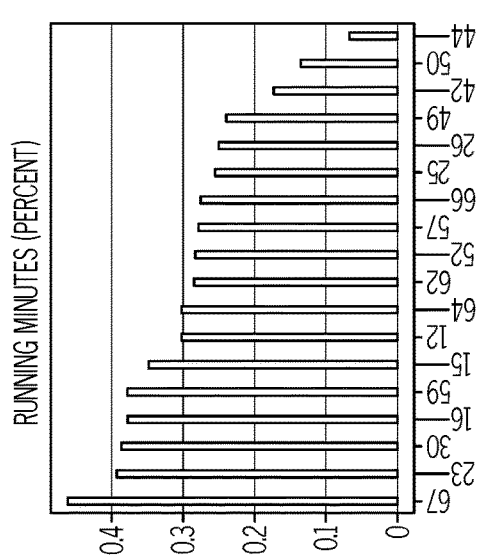
FIG. 7A through 7F of graphs of various aggregate values for a group of HVAC system with the sensors of FIG. 3A and 3B being used as training data for the machine learning system.
Figure 7B:
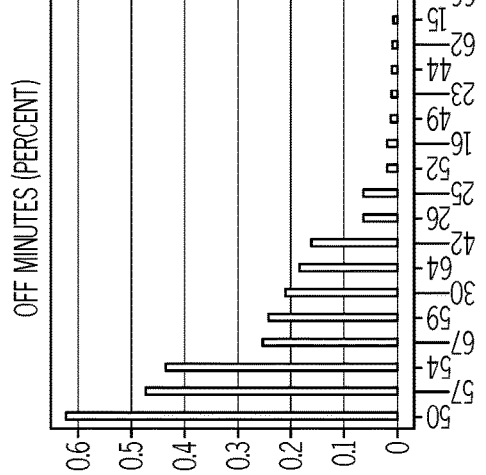
Figure 7A:
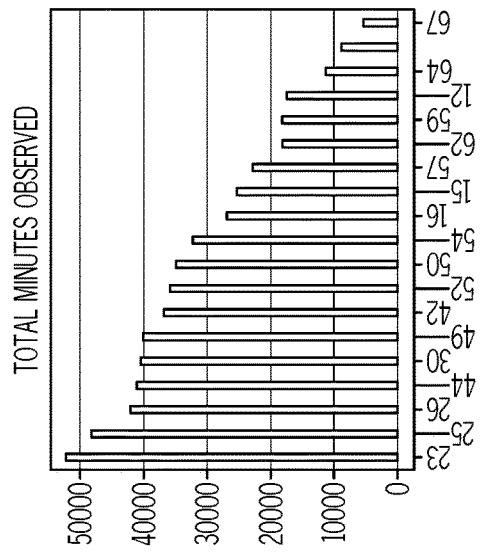
Figure 7F:
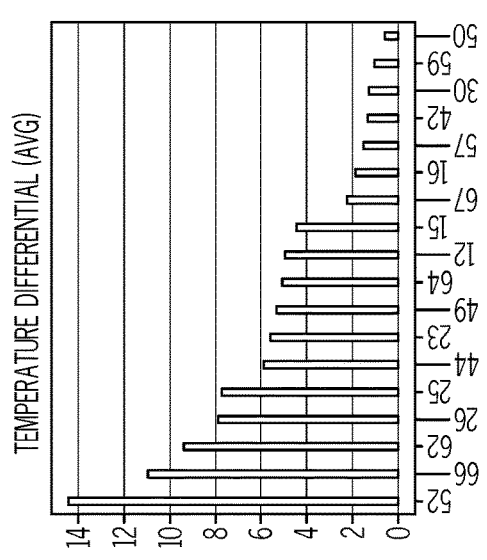
Figure 7E:
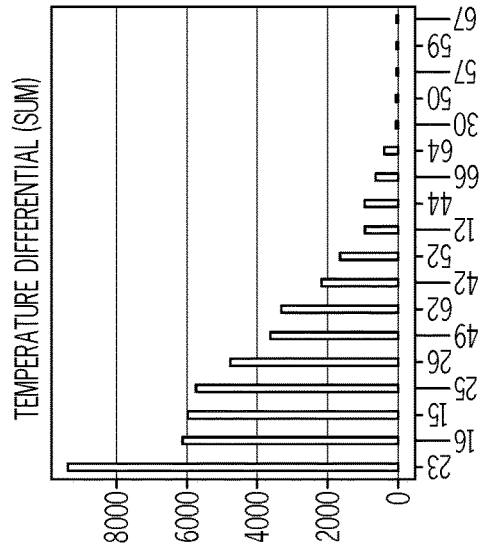
Figure 7D:
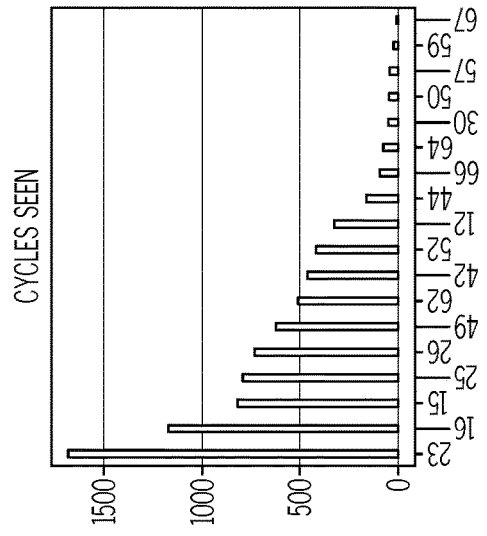

FIG. 7A through 7G of graphs of various aggregate values for a group of HVAC system with the wireless temperature and humidity sensors 308, 320 of FIG. 3A and 3B being used as training data for the machine learning system. More specifically, FIG. 7A is a histogram of total minutes measured on the Y-axis versus the distribution of HVAC length of time observed on the X-axis. FIG. 7B is a histogram of total percentage of minutes measured on the Y-axis versus the distribution of HVAC compressor 164 being OFF or not running on the X-axis. FIG. 7C is a histogram of total percentage of minutes measured on the Y-axis versus the distribution of HVAC compressor 164 being ONF or running on the X-axis. FIG. 7D is a histogram of total HVAC duty cooling cycles measured on the Y-axis versus the distribution of HVAC cycles running on the X-axis. FIG. 7E is a histogram of a sum of a temperature differential between the temperature measured at supply versus the temperature measured at the return on the Y-axis versus the distribution of HVAC cycles running on the X-axis. FIG. 7F is a histogram of a differential temperature between the temperature measured at supply versus the temperature measured at the return on the Y-axis versus the distribution of HVAC cycles running on the X-axis. It is important to note that graphs of FIG. 7A through FIG. 7F are only examples and many other combinations of measured data from sensors of FIGS. 3A and 3B is possible. These combinations are used as training value for a machine learning system to remotely diagnose other issues with the HVAC system 160 including condenser coil 162 is clogged with leaves and detritus and evaporator coil 216 is frosting.

Using the aggregate data, the present invention can compare and rank individual homes or business. "Healthy Min and Max" ranges for grading/report card. Customers may be given a personalized report on the health of their appliances. This report may be used to support warranty claims or to provide extended warranty underwriting. Much life many automotive insurance companies remotely monitor an insured or potentially insured driving habits to set policy rates, a health report on appliances can be used to set extended warranty rates The present invention allows remote monitoring of HVAC, refrigerators and water heaters using five or fewer wireless temperature and humidity sensors. Using these remote diagnoses, the right level of technician can be dispatch with the right tools an parts to increase efficiencies in home services. These sensors are simple to install by homeowners or if professional installation required is less than 30 minutes total time.

Figure 8:
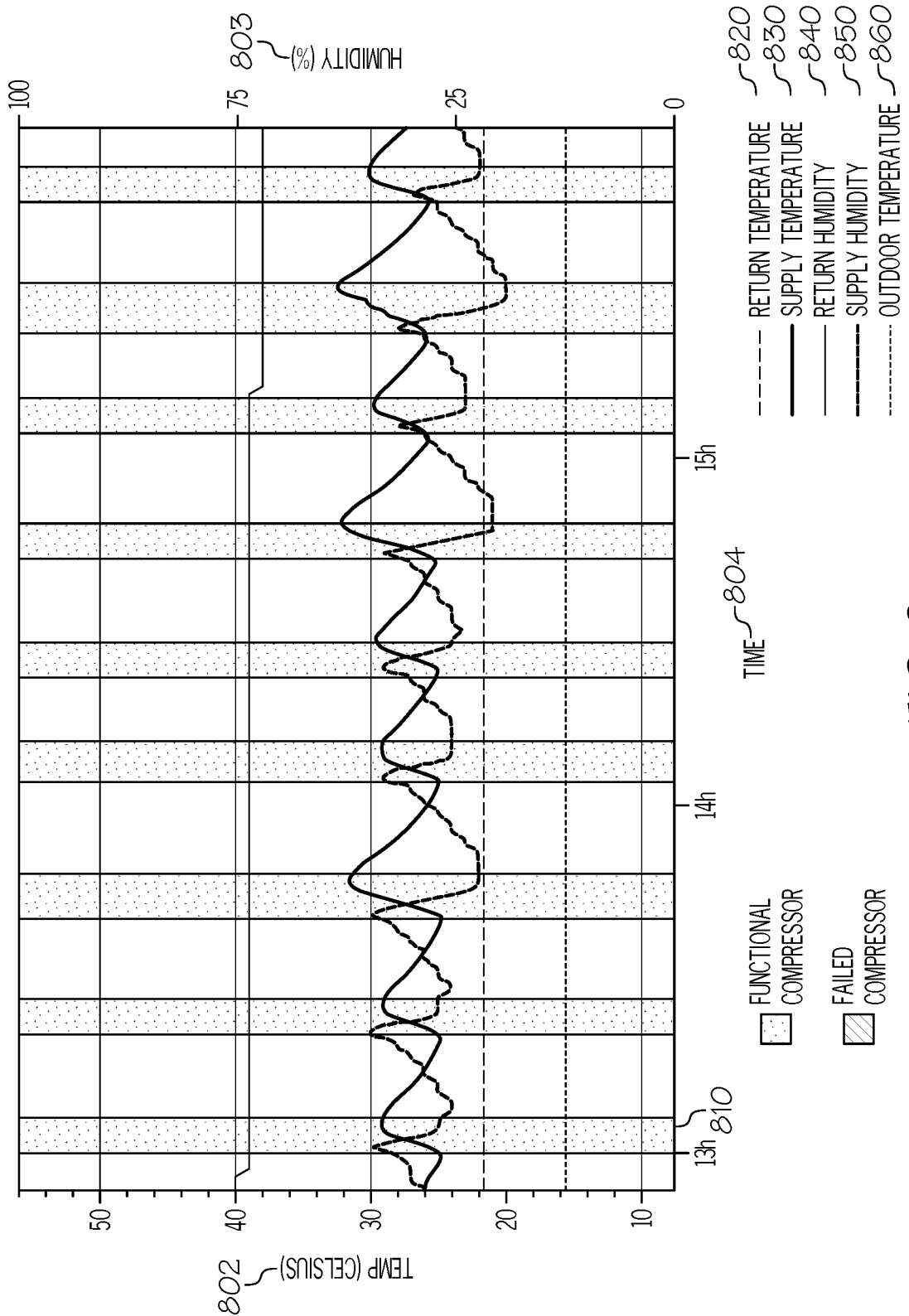
FIG. 8 is a graph of a derived HVAC system heating cycle using the sensors placed in FIGS. 3A and 3B.

Further this approach allows differentiating from other home service brands that don't use remote monitoring and provides a better customer experience. The present invention enables remote identification of degraded performance before customer experiences discomfort Derived HVAC Heating Cycle A heating cycle or heating duty cycle is when a resistive heating element 226 in an HVAC is "ON". FIG. 8 is a graph 800 illustrating remote derivation of HVAC system heating cycle using the wireless temperature and humidity sensors 308, 320 as placed in FIGS. 3A and 3B. Shown is temperature in degrees Celsius on the vertical or Y-axis 802, a second vertical axis or Y-axis for relative humidity second 803, and time in hours on the horizontal or X-axis 804. Shown are measured values from each of the return grill wireless temperature and humidity sensor 308 and the supply grill wireless temperature and humidity sensor 320 from FIG. 3. More specifically the measured values from the return grill wireless temperature and humidity sensor 308 are return humidity temperature 820 and return humidity 840. The measure values from the supply grill wireless temperature and humidity sensor 320 are supply temperature 830 and supply humidity 850. The outdoor temperature 860 of the location of the HVAC system 200 being analyze is accessed.

Using a combination the measured values 820, 830, 840, 850, and 860, the periods of time when the heating element 226 is energized or in an "ON" state is remotely derived by analyzing these measured values. The procedure for deriving this HVAC heating duty cycle is further described below.

Refrigerator Example

Figure 9:
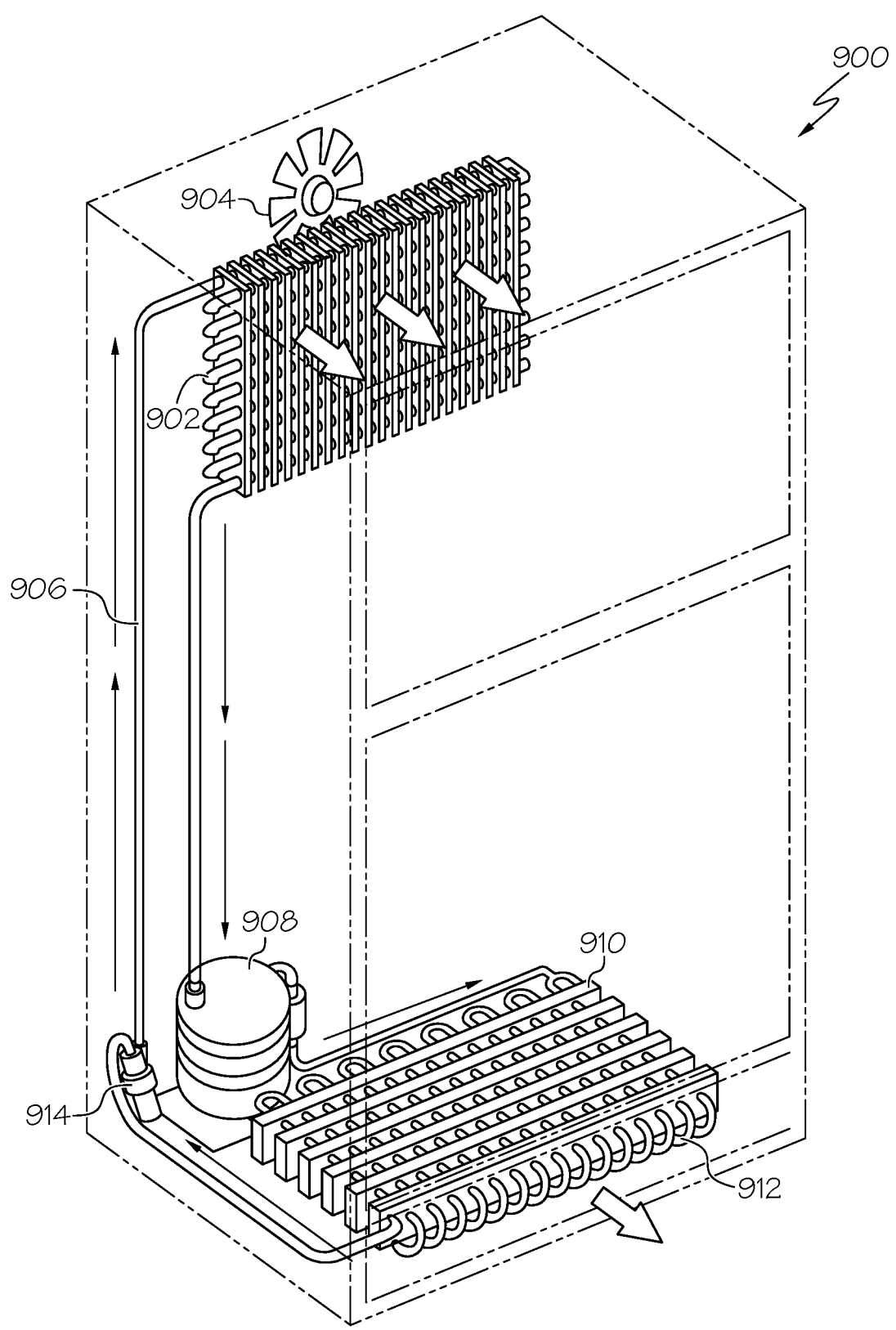
FIG. 9 are major components of a refrigerator/freezer, according to an example.

FIG. 9 are major components of a refrigerator/freezer 900, according to an example Like HVAC, refrigerators use the principles of pressure, condensing and evaporation of a refrigerant fluid in a closed circuit. However, unlike HVAC system to cool a room or area, a refrigerator removes heat and reduce the temperature inside of a sealed unit.

The refrigerant is circulated to cool the space in the fridge as shown in FIG. 9. The components in the cabinet are evaporator coils 902 and a evaporator fan 904. Tubing 906 carries the low pressure refrigerant back to the compressor 908. The refrigerant is compressed by the compressor 908 to a higher pressure and its temperature rises. The hot gas at high pressure is sent to condenser 910 where the heat is removed and the gas begins to condense into a liquid. The condenser 910 often includes ventilation fins 912 to help remove heat into the air. An expansion valve 914 where its pressure is lowered, it expands and some of the liquid turns very quickly into a vapor. This change of state has a cooling effect. The cold liquid is directed to the evaporator coils 902 absorbs the warmth from the air inside the refrigerator and turns back into a low temperature gas, at low pressure. The cycle repeats.

Placement of Sensors in HVAC System

Figure 10:
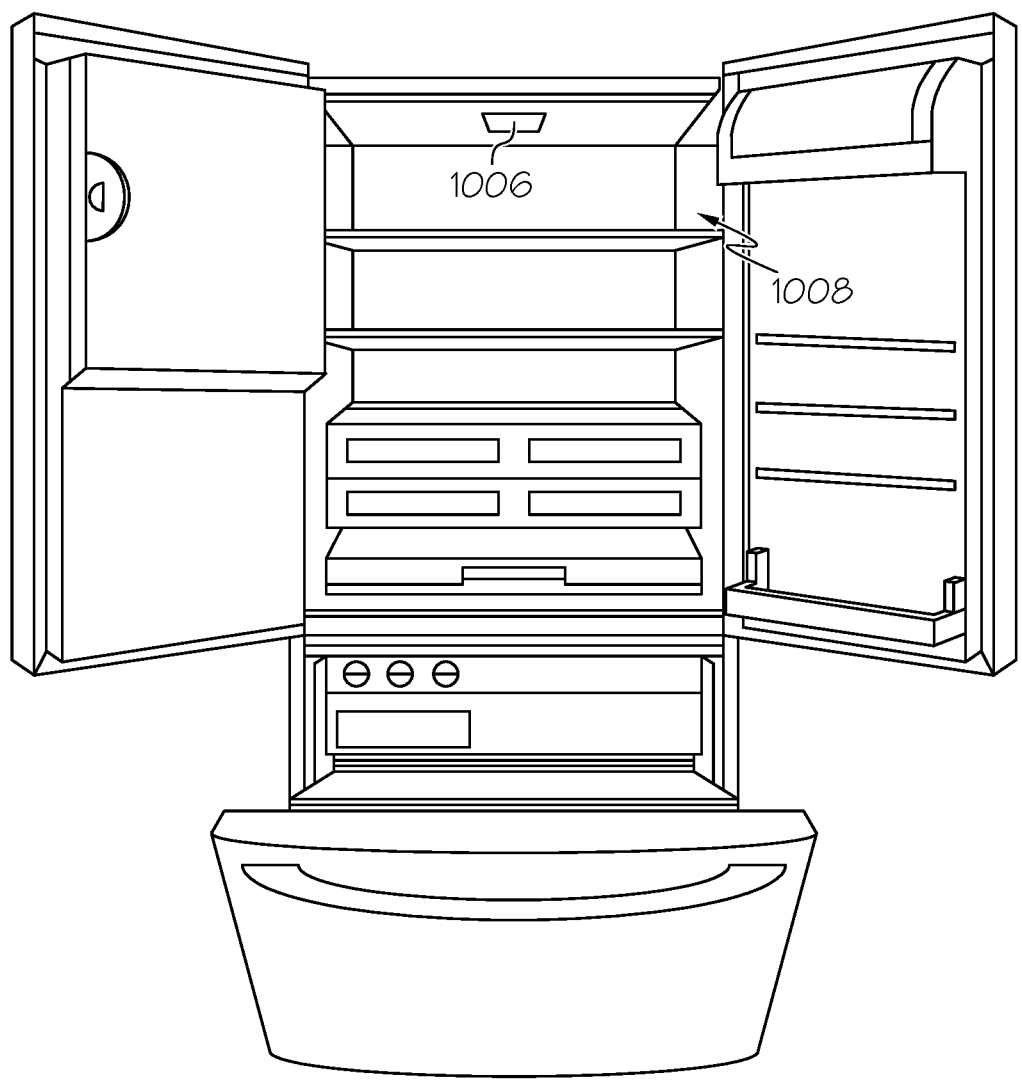
FIG. 10 is an example refrigerator interior ceiling with placement wireless temperature and humidity sensor, according to an example.
Figure 11:
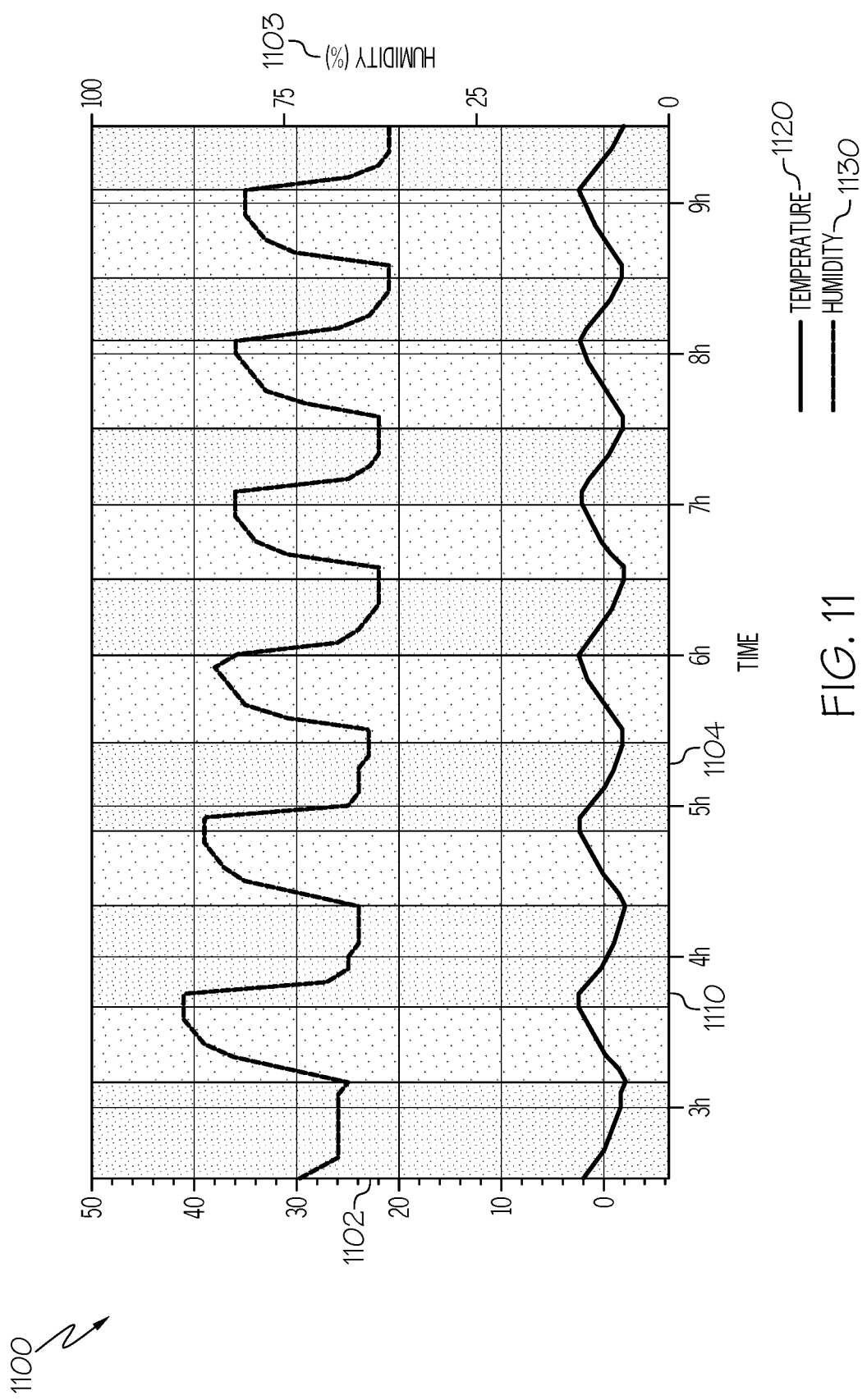
FIG. 11 is a graph of a derived refrigerator cooling using the sensor placed in FIG. 9, according to an example.

FIG. 10 is an example refrigerator interior ceiling with placement wireless temperature and humidity sensor, according to an example. Unlike HVAC system 200, the refrigerator only requires one sensor. As shown in the following diagram, one wireless temperature and humidity sensor 1008 is installed on the inside top 1006 of the refrigerator 1004. This places the sensor up and out of the way of the food. Place sensor in the middle of the inside top of fridge Derived HVAC Cooling Cycle A cooling cycle or cooling duty cycle is when a compressor 908 in the refrigerator 1000 is running or "ON". FIG. 11 is a graph 1100 illustrating remote derivation of refrigerator cooling cycle using the wireless temperature and humidity sensor 1008 placed in FIG. 10. Shown is temperature in degrees Celsius on the vertical or Y-axis 1102, a second vertical axis or Y-axis for relative humidity 1103 and time in hours on the horizontal or X-axis 1104. Shown are measured values from the wireless temperature and humidity sensor 1008. More specifically the measured values from the wireless temperature and humidity sensor 1008 are temperature 1130 and humidity 1130.

Using a combination the measured values 1120, 1130, the periods of time when the compressor 1010 is running or in an "ON" state is remotely derived by analyzing these measured values. The procedure for deriving this refrigerator cooling duty cycle is further described below.

The present invention may be extended to other appliance, such as, hot water heater by placing a humidity and temperature sensor on the pipe coming out of a water heater.

Over All Process Flow of Using Machine Learning

Figure 12:
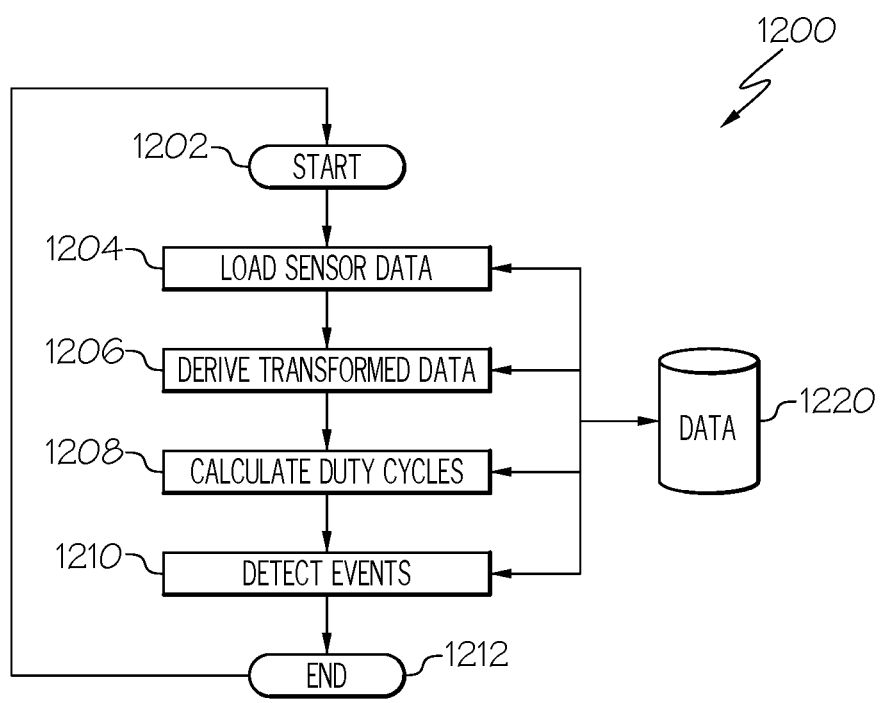
FIG. 12 is an overall process flow of using machine learning with the temperature and humidity sensors, according to an example.

FIG. 12 is an overall process flow 1200 of using machine learning with the temperature and humidity sensors. The process starts at step 1202 and immediately proceeds to step 1204. In step 1204, data including measured data from the temperature and humidity sensor(s) is accessed from a database 1220. The data includes data from multiple homes or business being monitored. The process proceeds to step 1206. In step 1206 the time position of each measured data point is adjusted. The data is adjusted by assigning each data point to its closest time bounds. In one example, this adjustment, or interpolation, ensures that all the data points share identical timestamps. For example this adjustment can typically be accomplished by forward filling to the nearest measure based on an overall time measurement granularity (i.e. number of minutes). This adjustment ensures that all the data points share the identical timestamp. In one example a B-Spline interpolation as well as polynomial interpolation are used. This step is described further with reference to FIG. 14 below. The process continues to step 1208 in which the duty cycle of the appliance is calculated using the transformed data. Next, in step 1210 one or more based on the duty cycles, one or more detected events are discovered such as, failing compressors, dirty evaporator coil or dirty condenser coil, bad blower and more. Note although this process is shown as running through only once from start 1202 to end 1212, it can be run on a schedule or whenever new data is available from the sensors and loop back to step 1202 as shown.

Over All Process Flow of Gathering Information on Specific Appliance

Figure 13:
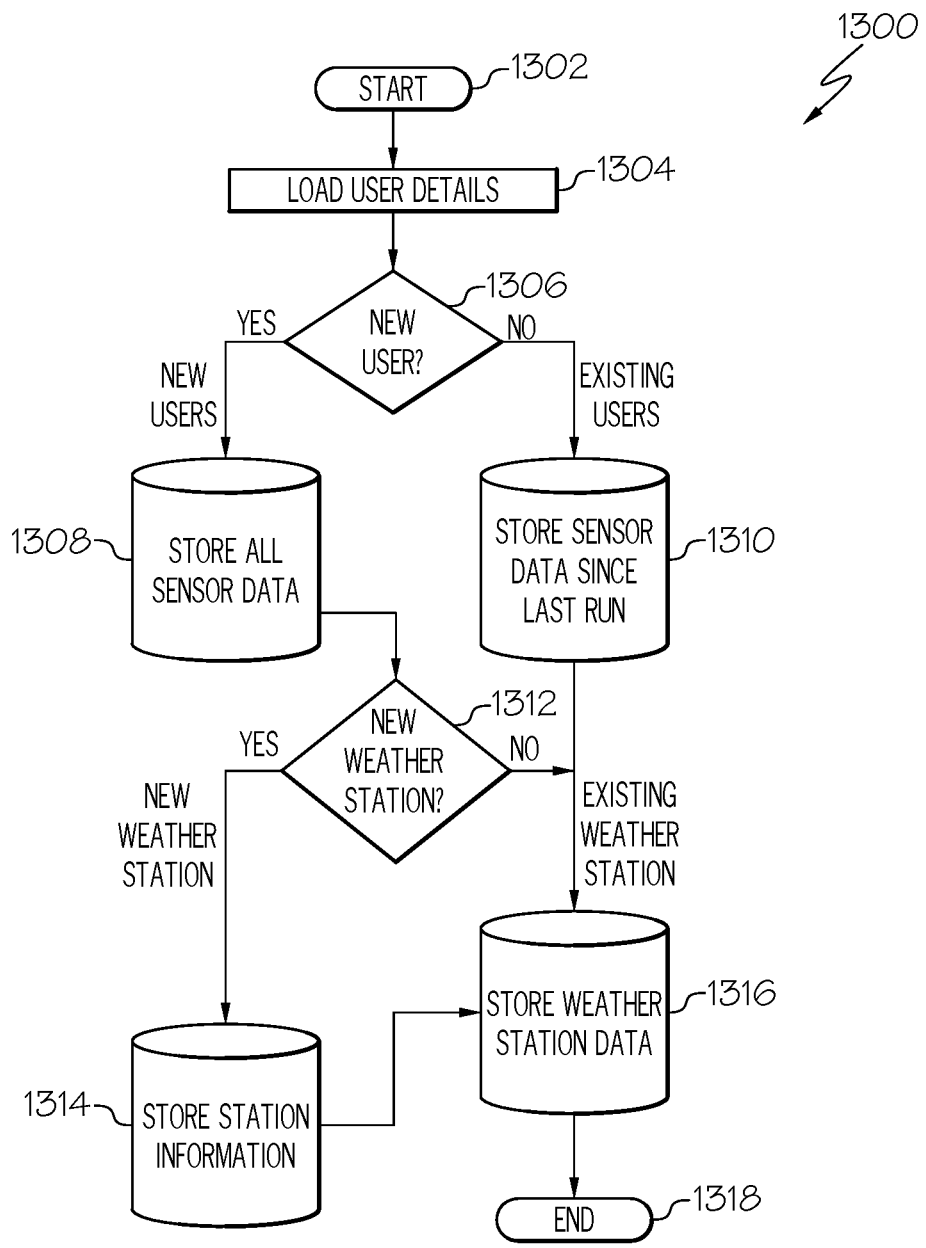
FIG. 13 is an overall process flow of storing data from a specific appliance from a specific user, according to an example.

FIG. 13 is an overall process flow 1300 of storing data from a specific appliance from a specific user, according to an example. The process begins in step 1302 and immediately proceeds to step 1304, in which details for a specific user are loaded. Next a test is made in conditional step 1306 to determine if the user is a new user. In the case the user is new, the process continues to step 1308 in which all the sensor data with time stamps is stored in a file or database repository 1220. Another test is made in conditional step 1312 to determine is a current weather station is associated with the new user location or if a closer weather station to the new user location is available. In the case that a weather station is not associated with the new user location, the system finds a close weather station and pulls the weather data for the same prior of time of the sensor data and stores it in step 1316 and the process ends in step 1318.

In conditional step 1306 if the user is not a new user, the process continues to step 1310. In step 1310 the information is stored from the last time period in the file or database repository 1220. The process continues to step 1316 in which any new weather information for the geographic location of the sensors are also stored. The process continues to step 1318 where it ends. Note although this process is shown as running through only once from start 1302 to end 1318, it can be run on a schedule or whenever new data is available from the sensors.

Over All Process Flow of Matching Sensor Data and Weather Data

Figure 14:
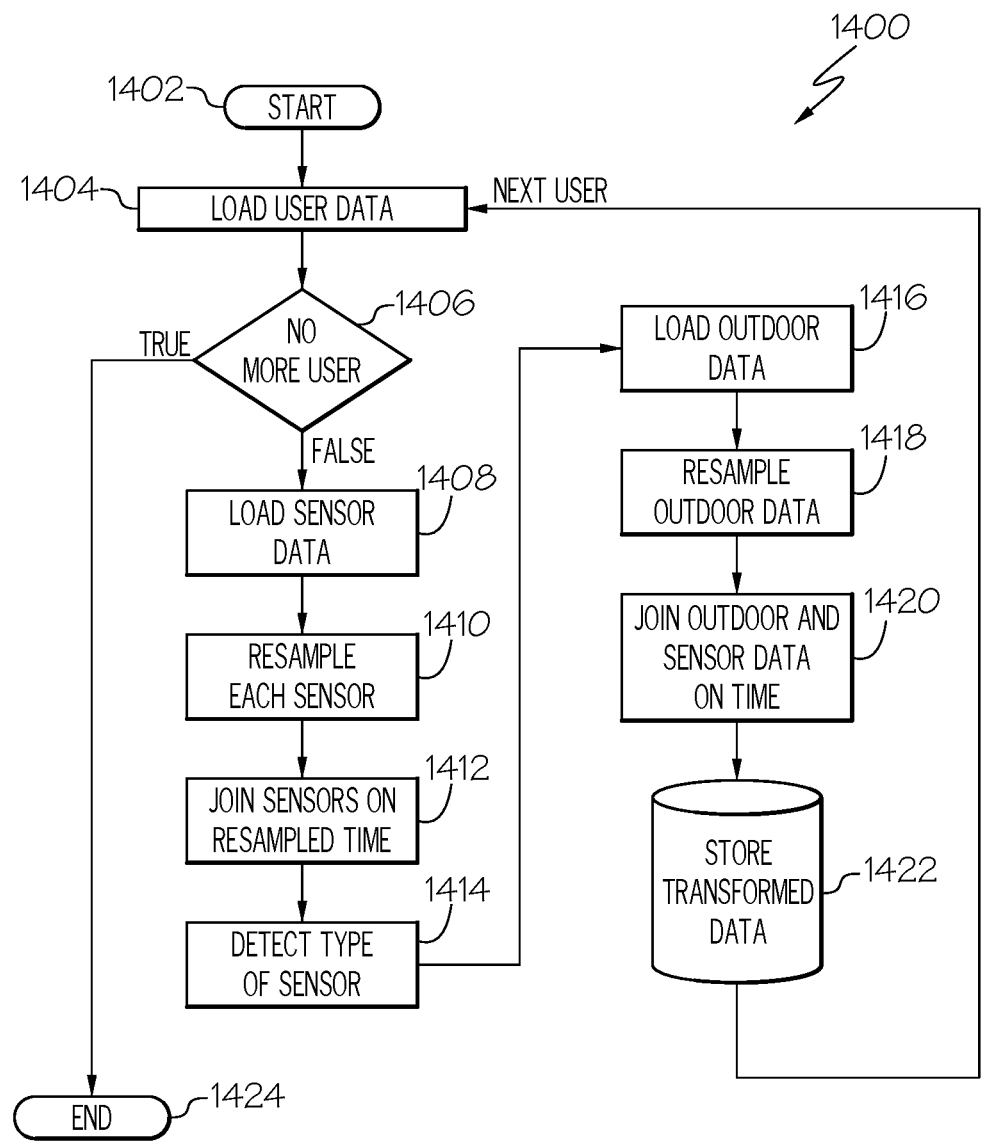
FIG. 14 is an overall process flow of matching transformed sensor data with transformed weather data from a specific user, according to an example.

FIG. 14 is an overall process flow 1400 of matching transformed sensor data with transformed weather data from a specific user, according to an example. The process begins in step 1402 and immediately proceeds to step 1404, in which details for a specific user are loaded. Next a test is made in step 1406 to determine if there is more user data. In the case there is no more user data, the process ends in step 1424. Otherwise, in the event there is new user data, the process continues to step 1408. In step 1408 the latest sensor data is retrieved from wireless appliance sensors. Note this data may be directly accessible from the sensor itself or cached in the cloud system 180. The process continues to step 1410 where the sensor data is re-sampled. As explained above, everything is placed at the closest time bounds by forward filling interpolation to the nearest time measurement based on the measurement granularity. The process continues to step 1412. In steps the data from the various data sources and sensors are joined. Joined is used here to denote combining data from two sets of data or databases, such as an Structured Query Language (SQL) join. In this example all the data is joined to share the same time indexes by timestamp and sensor subgroup ID this provides an overall view of the state of an observation. The cross product of data sources by timestamp and sensor subgroup are collected to give an overall state of an observation.

The process continues to step 1414. In the process detects the type of appliance wireless sensor e.g. refrigerator wireless temperature and humidity sensor, hot water heater wireless temperature and humidity sensor, HVAC supply vent wireless temperature and humidity sensor, or HVAC return vent wireless temperature and humidity sensor. The process continues to step 1416. In step 1416, the weather data corresponding to the geographic location of the sensors in step 1414 is loaded and the process continues to step 1418. In step, 1418 the weather data is rejoined. The previous point needs to be known so that relative extremas can be set. Once a new point is acquired, the extrema can be updated if necessary. For example, if the new point is greater than your relative maxima or less than your relative minima. This process is continued until the full cycle is defined as the first training set. Both minima and maxima are expressed and have different timestamps.

The process continued to step 1420 and the process continues to step 1422 in which the transformed data is stored. Next, the process continues to step 1404.

Over All Process Flow of Predicting Component Failure in an Appliance

Figure 15A:
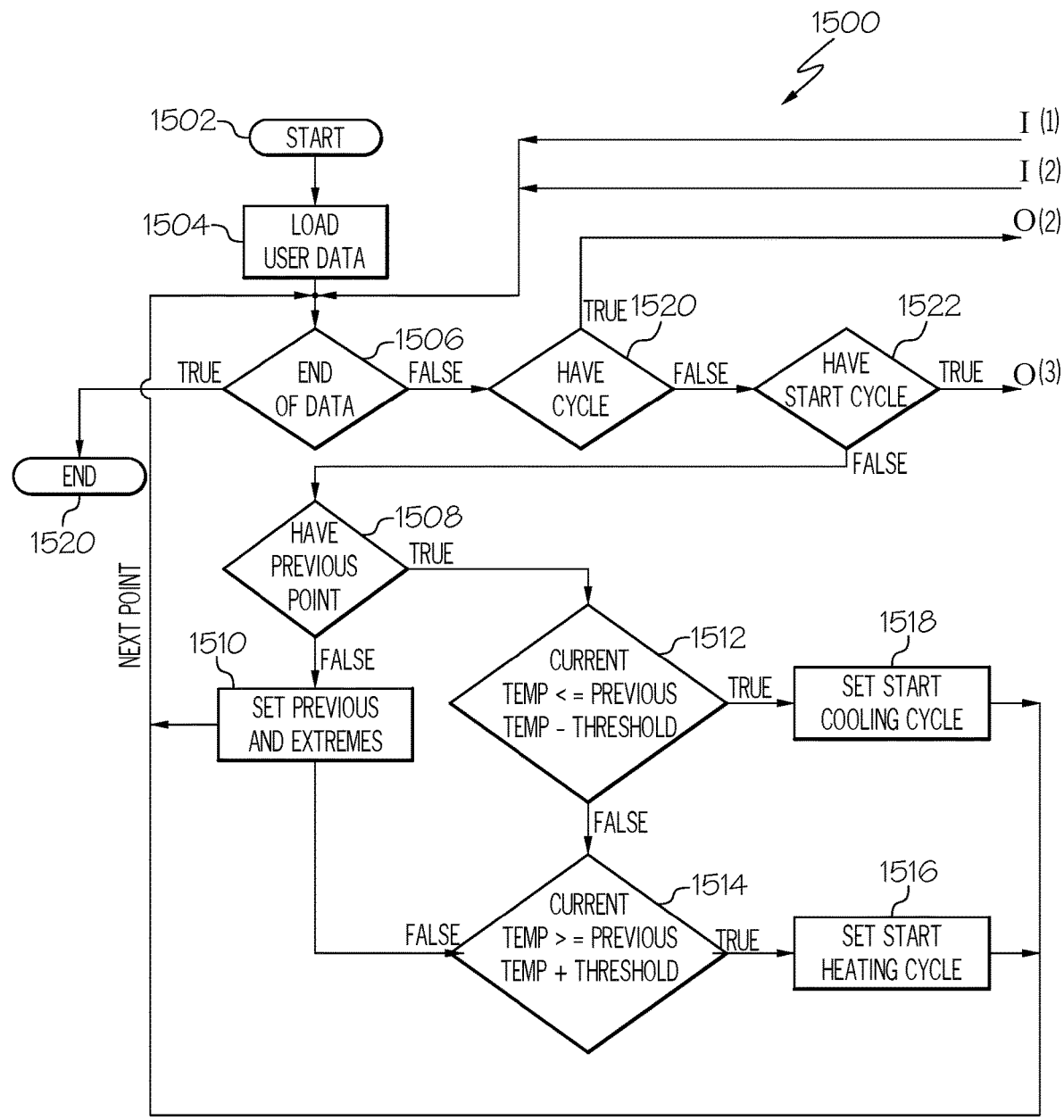
FIG. 15A, FIG. 15B, and FIG. 15C is an overall process flow of predicting component failure in an appliance, according to example.
Figure 15B:
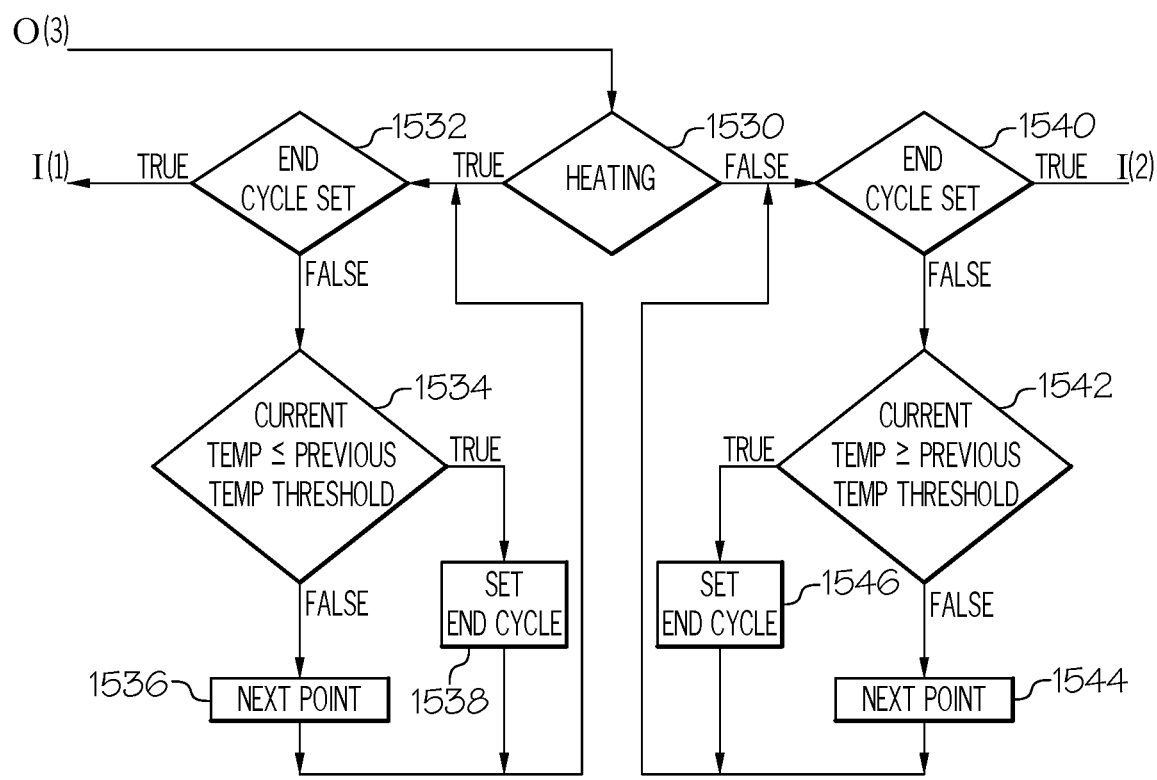
Figure 15C:
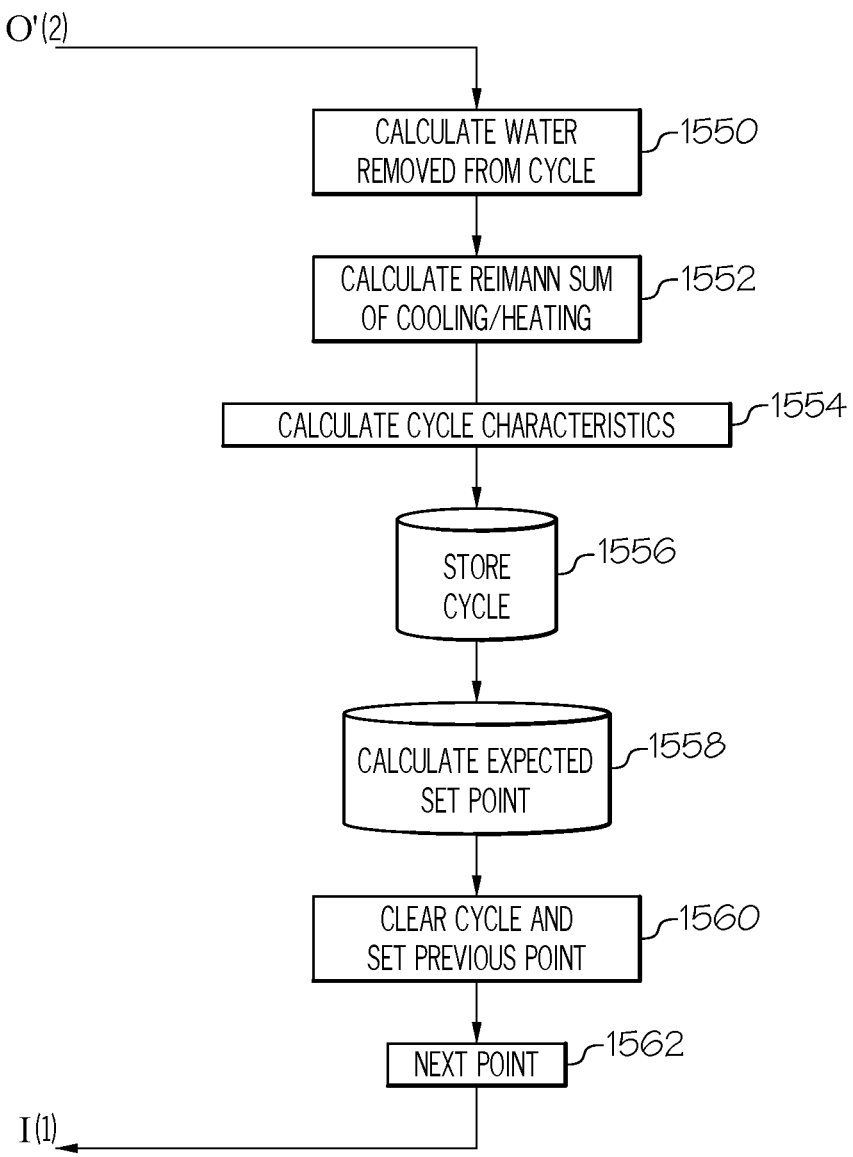

FIG. 15A through FIG. 15C is an overall process flow 1500 of predicting component failure in an appliance. The process starts at 1502 and immediately proceeds to step 1504. In step 1504 the data for a specific house, business, user is loaded and process proceeds to step 1506. In step 1506, a test is made to see if end of data for the user is reached. In the event that end of the user data is reached, the process ends in step 1520.

Otherwise, in the end of the data is not reached in conditional step 1506, in which if there is more data to process i.e. "False", the process flows to conditional step 1520. A test to made to determine if a complete heating or cooling cycle is identified. As described above a fully defined cycle means that both minima and maxima are expressed and have different timestamps. In the event a fully defined cycle is determined that process continues to output O(2) shown on FIG. 15C

Otherwise in conditional step 1520 in the event a complete cycle is not yet identified, the process continues to conditional step 1522. In conditional step 1522 is a start cycle is not yet identified the process loops back to step 1508 to identify the start cycle process. Otherwise if the start cycle is identified, the process continues to O(1) shown on FIG. 15B.

Otherwise in conditional step 1522, the process continues to conditional step 1508. In conditional step 1508, a test is made to see if there is a previous point. The previous data point is a data point from a timestamp is mathematically: previous data point=current time stamp–measurement granularity. This condition exists to express the initial state when a previous point is not available, such as when the process begins at the beginning or the origin of a measurement timeline.

In the event there is not a previous point, the process continues to step 1510. In step 1510 the previous point is set and the extrema's. The previous point needs to be retrieved so that relative extremas can be set. Once a new point is acquired, the extrema can be updated if necessary based upon the new point being greater than the current relative maxima or less than the current relative minima. This process is continued until a cycle is fully defined for the first training set. A fully defined cycle means that both minima and maxima are expressed and have different timestamps.

The process loops back to conditional step 1506. Otherwise, in conditional step 1508 is there is a previous point the process flows to conditional step 1512. In conditional step 1512 a test is made to see if the current temperature is less than or equal to a previous temperature and threshold. In the case the current temperature is not less than or equal to the previous temperature minus a threshold, the process flows to step 1518. In step 1518, the start of the identified cooling cycle is set and the process returns to step 1506.

Otherwise, in the case that the current temperature is not less than to a previous temperature and threshold the process goes to conditional step 1514. In conditional step 1514, a test is made to see if the current temperature is greater than or equal to a previous temperature and threshold. In the case, the current temperature is greater than or equal to the previous temperature plus a threshold, the process flows to step 1516. In step 1516, the start of the identified heating cycle is set and the process returns to conditional step 1506.

Turning now to FIG. 15B, the output of step 1522 also flows into conditional block 1530 in which a test is made to see if the HVAC system 200 is in a heating mode. In the case, a heating mode is "ON" or true as measured by return vent wireless temperature and humidity sensor 320 as compared with the supply vent wireless temperature and humidity sensor 308, the process flows to step 1532 in which a conditional block 1532 is entered. A test is made if the end of the heating cycle is set. In the case the end of the heating cycle is set, the process continues back to FIG. 15A to step 1506. Otherwise, in the event the end of the heating cycle is not identified the process flows to conditional step 1534.

In conditional step 1534, a test is made to determine if the current temperature is less than the previous temperature with a settable threshold. In the case, the condition is true, the process continues to step 1538. In step 1538 the end cycle for heating is set and the process loops back to step 1532. Otherwise, if the condition is false in step 1534, the process continues to step 1536. In step 1536 the next data point in time is retrieved and the process loops back to step 1532.

Referring to FIG. 15B, in the case that the heating mode in step 1530 is not true, the process continues to step 1540 the process mirrors the process for the heating mode but now the cooling mode is identified. In step 1540, a test is made to see if it is at the end of the cycle for cooling. In the case the end of the cooling cycle is set, the process continues back to FIG. 15A to step 1506. Otherwise, in the event the end of the cooling cycle is not identified the process flows to conditional step 1534.

In conditional step 1540, a test is made to determine if the current temperature is less than the previous temperature with a settable threshold. In the case, the condition is true, the process continues to step 1546. In step 1546 the end cycle for cooling is set and the process loops back to step 1540. Otherwise, if the condition is false in step 1542, the process continues to step 1544. In step 15446 the next data point in time is retrieved and the process loops back to step 1540 as shown.

Turning now to FIG. 15C, the process is enters from step 1520 on FIG. 15A. In step 1552, a calculation is made to remove water from the cycle. One calculation that has been successfully used is:

$$\text{water\_weight}=6.112*e^{(17.67*\text{ambient\_temperature}/(243.5+\text{ambient\_temperarture}))}*\text{ambient\_humidity}*2.1674/(273.15+\text{ambient\_temperature})*\text{reporting\_interval} \quad (EQ1)$$

This is corroborated with other formulas:

$$\text{saturation\_pressure}=6.116441*\text{pow}(10,(7.591386*\text{ambient\_temp}/(\text{ambient\_temperature}+240.7263))*\text{ambient\_humidity} \quad (EQ2)$$

$$\text{water\_weight}=2.16679*\text{saturation\_pressure}/(273.15+\text{ambient\_temperature})*\text{reporting\_interval} \quad (EQ3)$$

where ambient_temperature and ambient_humidity used in the equations above are the current data point ready from the return wireless temperature and humidity sensor 308.

The process flows to step 1552. In step 1552, the Riemann Sum of cooling/heating is calculated and the process flows to step 1554. In step 1554, the heating or cooling cycle of characteristics is calculated. Examples of cycle characteristics calculated are duration, depth of heating/cooling, difference of indoor and outdoor temperature, duration since last cycle. The process continues to step 1556.

Cycle characteristics that are captured are described in the points captured in heating or cooling cycle definition. The points captured include each of: 1) maxima and minima readings; 2) supply wireless temperature and humidity reading and return wireless temperature and humidity readings; 3) outdoor temperature and humidity, timestamps, area under the curve. The resultant Riemann sum S, difference of area between supply wireless temperature and humidity reading and return wireless temperature and humidity reading i.e., mathematically:

$$S = \sum_{i=0}^{n} f(ts_i^*)\Delta x_s - \sum_{i=0}^{n} f(tr_i^*)\Delta x_r \qquad (EQ4)$$

where $\Delta x_i = x_i - x_{i-1}$ and $x_i^* \in x_i - x_{i-1}$; n is the number of data points, ts is temperature of supply at time i and tr is temperature of return at time i.

The Reimann sum up to the midpoint of the cycle. This is used to determine shape of the tail, the water weight of the return and supply through both methods described as described above in EQ1 through EQ3. Using a combinations of EQ1 through EQ4 we can derive many readings, those derivations would be unique to each implementation and what is being sought. Derived set point estimates occur from a set of historic cycles and their average ambient temperature at the end of the cycle. The process continues to step 1556.

In step 1556, the cycle is stored and the process continues to step 1558. In step 1558, the expected set point is calculated and the process continues to step 1560. In step 1560, the cycle is cleared and the previous point set. The previous point is the last point of the cycle in time. This is used as a starting point for the next cycle as a basis for extremas. The process continues to step 1562 in which the next point is retrieved and the process return to step 1506 of FIG. 15A.

Correlating Duty Cycles with Events

Figure 16A:
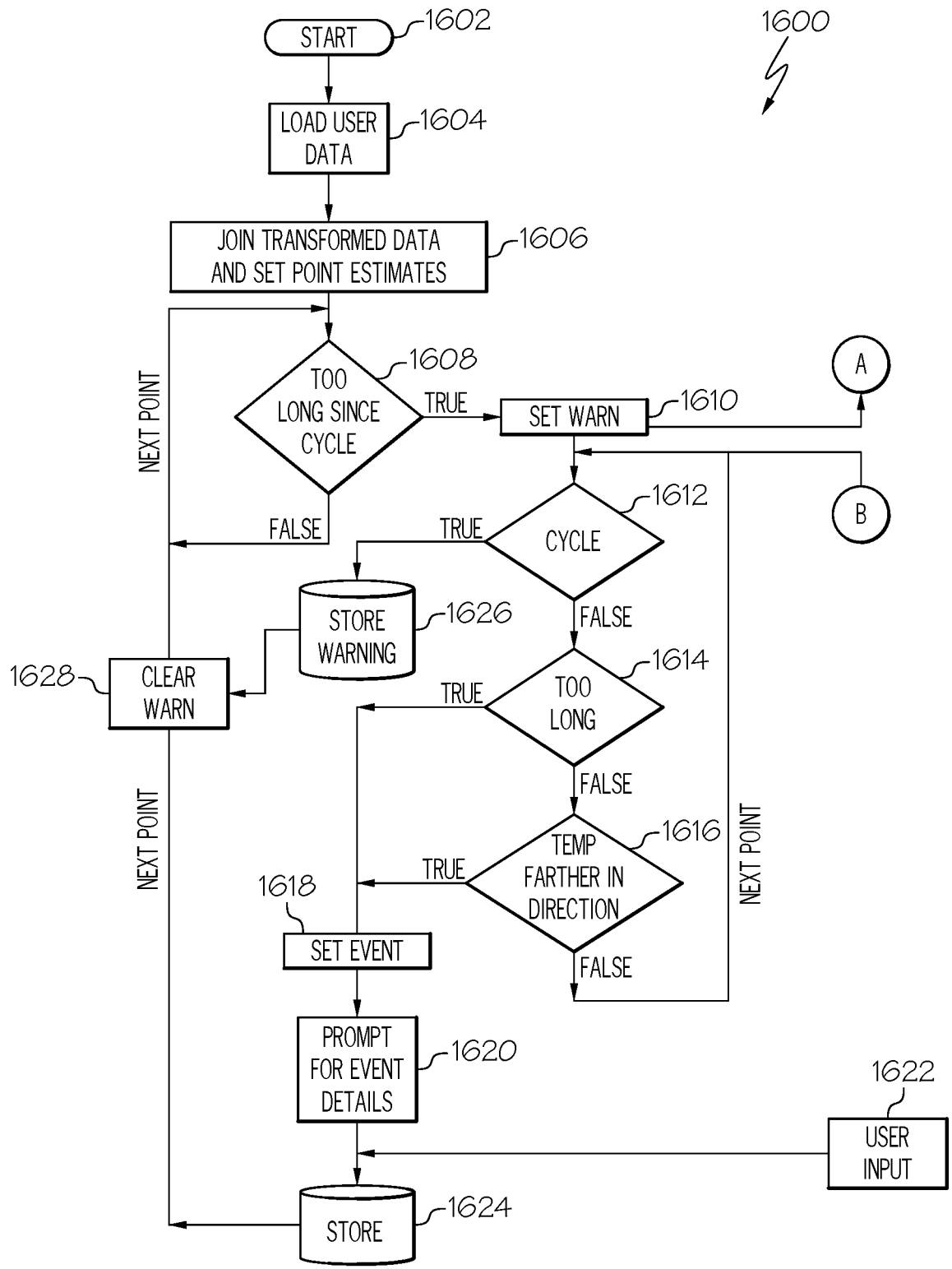
FIG. 16A, FIG. 16B, and FIG. 16C is an overall process flow of correlating cooling and heating duty cycles with events, according to an example.
Figure 16B:
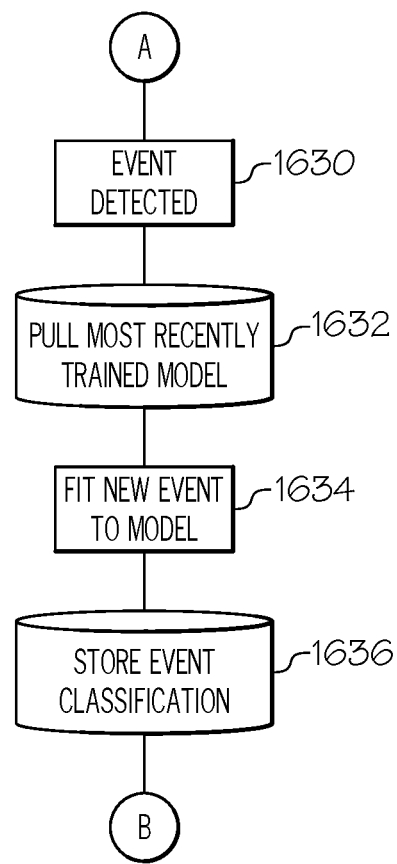
Figure 16C:
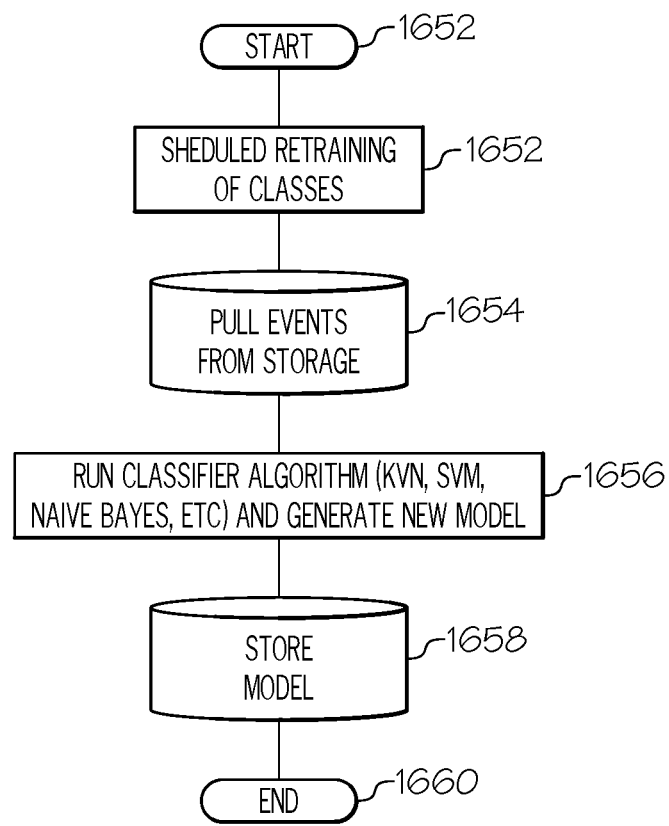

FIG. 16A, FIG. 16B, and FIG. 16C is an overall process flow 1600 of correlating cooling and heating duty cycles with events, according to an example. This is the second training set. The process starts in step 1602 and immediately moves to step 1604. In step 1604, the user data for a specific set of sensors is loaded and the process continues to step 1606. In step 1606 the transformed data is joined and the set point estimates completed. As described above the data is adjusted by assigning each data point to its closest time bounds. This adjustment is typically performed by forward filling to the nearest measure based on an overall time measurement granularity (i.e. number of minutes).

The process flows into conditional step 1608. In conditional step 1608, a test is made to determine if it has been too long since the last cycle. This is a settable threshold that is tested. In the case it is not been too long i.e. false, the process loops back to step 1608. Otherwise in step 1608 if it has been too long since last cycle the process continues to step 1610 and a warning is set and process continues to conditional step 1612. In parallel, the process also flow to FIG. 16B, in which, classifier fitting is performed as further described below.

If there is a cycle in step 1612, the process moves to 1626 and stores the warning set in 1610. It then moves to 1628 and clears the warning from working memory. Otherwise the process continues to conditional step 1614. In step 1614, a test is made to see if too long. In the case that the wait is not too long, the process continues to step 1618. Otherwise, in the case is not too long i.e. false the process continues to conditional block 1616. In conditional block 1616, a test is made to see if the temperature is moves further in a given direction. In the case the temperature is not moving in a given direction the process loops back to step 1612.

There is a secondary duration consideration use. The secondary consideration is if the time has been twice as long as considered in step 1608, the system identifies it as an event. Alternatively, if the flow exceeded the temperature threshold demonstrably in step 1616, an event is set. Otherwise, the system retrieves the next data point and consider if it's a new cycle with a transition to step 1612.

Otherwise, in the case the temperature in conditional block 1616 is continuing in the given direction the process continues to step 1618. In step 1618, an event is set and a prompt for event details in step 1620. This is training from existing users for supervised machine learning training. The users provide feedback and details about the warnings and errors. In one example, these errors and warning are first trained within a lab setting by causing various component failures. This provides a default list of failures related to the temperature and humidity characteristics measured for the rest of the training process.

User input 1622 is given and the results stored in step 1624. Now details about the event is captured. The details include event type, planned/unplanned, observations of the event e.g. duration of the event, anomalies in temperature, humidity, etc. This feedback from users labels the data captured.

The difference between a warning and an event is degree of confidence. In a warning the system identifies there may be a problem. In an event the system has identified a warning for some duration and the initial problem that was being warned of has not improved or has degraded further.

Next the process stores the event in 1620 and loops back to step 1612.

It is important to note that this is new data being fetches as described in FIG. 15A. This new data is pulled in the edges going into step 1612 from step 1620 and step 1616 and on the edge between step 1612 and 1608. The cycle here is the presence of a new HVAC cycle. During this process if a new cycle appears then the current warning about duration since last cycle is stale and needs to be reentered.

Classifier Fitting

As described above, one a warning is set in step 1610 the process goes into a parallel path for classifier fitting. The purpose of classifier fitting is to try to match an event detected to the most recent machine learning model built as shown in FIG. 16C. The first step in the parallel process is after a warning is set in step 1610 is to set that an event is detected in step 1630. The most recently trained model, that was previously stored in step 1624 is pulled in step 1632. A best fit of the event pattern detected is fit to the model in step 1634. This is event classification is stored in step 1636 and this parallel process flows back to step 1612.

Classifier Training

FIG. 16C is a program segment that runs independently with FIG. 16A and FIG. 16B. The process starts with the schedule in step 1652 being satisfied. Typically the flow in FIG. 16C runs on a schedule, such as weekly, monthly, quarterly, etc. Events are retrieved from storage in step 1654.

A classifier algorithm is run in step 1656. This produces a new machine learning model. Example classifier algorithms are Linear Regression, Logistic Regression, Decision Tree, Naive Bayes, kNN and others. The presently claimed invention is not limited to a specific type of machine learning classifier algorithm and any single or combination of classifier algorithms may be used. The new model is stored in step 1658. The process ends in step 1660 until the next schedule.

Information Processing System

Cloud computing or analytics server 180 of the present subject matter can be realized in hardware, software, or a combination of hardware and software. A system 180 can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Figure 17:
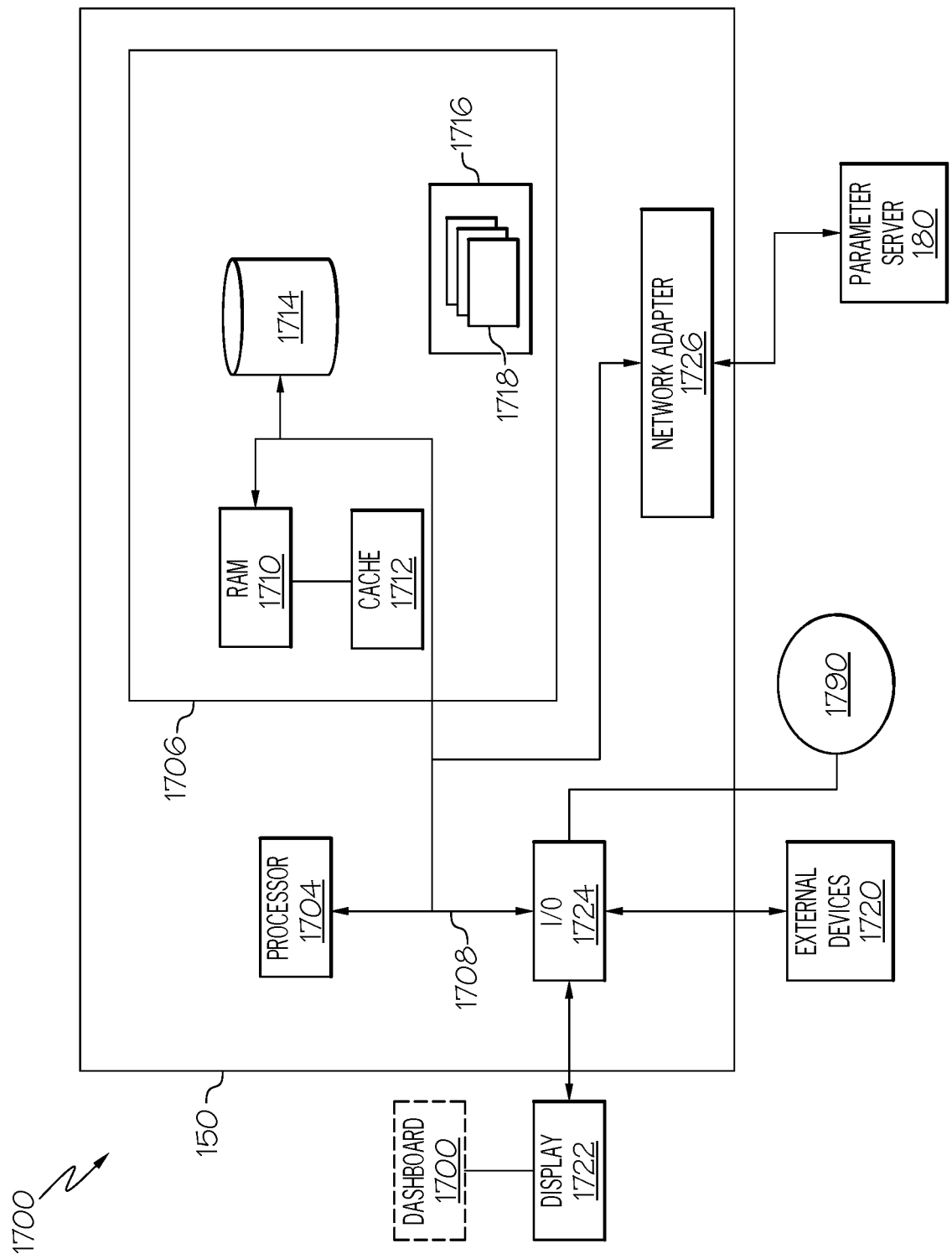
FIG. 17 illustrates a block diagram of a server system, according to an example.

FIG. 17 illustrates a block diagram of an exemplary system for analytics server 180, according to an embodiment of the present invention. The system 1700 shown in FIG. 17 is only one example of a suitable system and is not intended to limit the scope of use or functionality of embodiments of the present invention described above. The system 1700 is operational with numerous other general purpose or special purpose computing system environments or configurations.

The system 1700 may be described in the general context of computer-executable instructions, being executed by a computer system. The system 1700 may be practiced in various computing environments such as conventional and distributed computing environments where tasks are performed by remote processing devices that are linked through a communications network. In a distributed computing environment, program modules may be located in both local and remote computer system storage media including memory storage devices.

Referring again to FIG. 17, system 1700 includes the analytics or cloud server 180. In some embodiments, the cloud or analytics server 180 can be embodied as a general-purpose computing device. The components of cloud or analytics server 180 can include, but are not limited to, one or more processor devices or processing units 1704, a system memory 1706, and a bus 1708 that couples various system components including the system memory 1706 to the processor 1704.

The bus 1708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1706 can also include computer system readable media in the form of volatile memory, such as random access memory (RAM) 1710 and/or cache memory 1712. The cloud or analytics server 180 can further include other removable/non-removable, volatile/non-volatile computer system storage media. By way of example only, a storage system 1714 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1708 by one or more data media interfaces. The memory 1706 can include at least one program product embodying a set of program modules 1718 that are configured to carry out one or more features and/or functions of the present invention e.g., described with reference to FIGS. 1-16. Referring again to FIG. 17, program/utility 1716, having a set of program modules 1718, may be stored in memory 1706 by way of example, and not limitation, as well as an operating system, one or more application programs, other program modules, and program data. Generally, program modules may include routines, programs, objects, components, logic, data structures, and so on that perform particular tasks or implement particular abstract data types. Each of the operating system, one or more application programs, other program modules, and program data or some combination thereof, may include an implementation of a networking environment. In some embodiments, program modules 1718 are configured to carry out one or more functions and/or methodologies of embodiments of the present invention.

The cloud or analytics server 180 can also communicate with one or more external devices 1720 that enable interaction with the cloud or analytics server 180; and/or any devices (e.g., network card, modem, etc.) that enable communication with one or more other computing devices. A few (non-limiting) examples of such devices include: a keyboard, a pointing device, a display 1722 presenting system performance tuning dashboard 500, etc.; one or more devices that enable a user to interact with the cloud or analytics server 180; and/or any devices (e.g., network card, modem, etc.) that enable the cloud or analytics server 180 to communicate with one or more other computing devices. Such communication can occur via I/O interfaces 1724. In some embodiments, the cloud or analytics server 180 can communicate with one or more networks such as a local area network (LAN), a general wide area network (WAN), and/or a public network (e.g., the Internet) via network adapter 1726, enabling the system 1700 to access measurement data in database 1220. As depicted, the network adapter 1726 communicates with the other components of the cloud or analytics server 180 via the bus 1708. Other hardware and/or software components can also be used in conjunction with the cloud or analytics server 180. Examples include, but are not limited to: microcode, device drivers, redundant processing units, external disk drive arrays, RAID systems, tape drives, and data archival storage systems.

As will be appreciated by one skilled in the art, aspects of the present invention may be embodied as a system, method, or computer program product 1790 at any possible technical detail level of integration. The computer program product 1790 may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, although not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, although not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer readable storage medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A computer implemented method for remote performance monitoring of a ventilation system comprising:
   accessing first sensor data from a first sensor placed on a return air grill for measuring a return temperature and a return humidity of air going into a return of a ventilation system for heating, cooling or a combination thereof;
   accessing second sensor data from a second sensor placed on a supply air grill for measuring a supply temperature and a supply humidity of air coming out of the ventilation system;
   determining an on-off duty cycle of an
      on-time period during which the ventilation system is operating to change a temperature, humidity, or combination thereof, between the air as measured by the first sensor on the return air grill and the air as measured by the second sensor on the supply air grill, and
      off-time period during which the ventilation system is not operating to change a temperature, humidity, or combination thereof, between the air as measured by the first sensor on the return air grill and the air as measured by the second sensor on the supply air grill;
   creating a first training set of the on-off duty cycle;
   training a machine learning algorithm with the first training set;
   creating a second training set of return temperature, return humidity, supply temperature, supply humidity during each the on-off duty cycle;
   training the machine learning algorithm with the second training set; and
   using the machine learning algorithm from the first training set and the second training set, and the on-off duty cycle to predict that a component of the ventilation system is faulty.

2. The computer implemented method of claim 1, wherein the determining an on-off duty is carried out independent of data from an electric meter measuring current consumed by the ventilation system.

3. The computer implemented method of claim 1, wherein the determining an on-off duty is carried out independent of data from a ventilation thermostat which controls the ventilation system.

4. The computer implemented method of claim 1, wherein the determining an on-off duty is carried out independent of data from an electric meter measuring current consumed by the ventilation system and wherein the determining an on-off duty is carried out independent of data from a ventilation thermostat which controls the ventilation system.

5. The computer implemented method of claim 1, further comprising:
   accessing outside air temperature data and outside air relative humidity corresponding to a geographic location in which the ventilation system is operating; and wherein the creating the second training set includes the outside air temperature data and the outside air relative humidity data.

6. The computer implemented method of claim 1, further comprising:
   using supervised machine learning with event models built from previously measured datasets of sensor data with two or more datasets of the first sensor data, the second sensor data and the on-off duty cycle to predict that a component of the ventilation system is faulty.

7. The computer implemented method of claim 6, wherein the component is at least one of:
   a compressor,
   a blower,
   a refrigerant charge;
   a drain line float switch
   a filter, and
   a heating element.

8. A computer implemented method for remote performance monitoring of a ventilation system comprising:
   accessing first sensor data from a first sensor placed on a return air grill for measuring a return temperature and a return humidity of air going into a return of the ventilation system for heating, cooling or a combination thereof;
   accessing second sensor data from a second sensor placed on a supply air grill for measuring a supply temperature and a supply humidity of air coming out of the ventilation system;

using only data from the first sensor and data from the second sensor to determine an on-off duty cycle of an
on-time period during which the ventilation system is operating to change a temperature, humidity, or combination thereof, between the air as measured by the first sensor on the return air grill and the air as measured by the second sensor on the supply air grill, and
off-time period during which the ventilation system is not operating to change a temperature, humidity, or combination thereof, between the air as measured by the first sensor on the return air grill and the air as measured by the second sensor on the supply air grill; and
using supervised machine learning with event models built from previously measured datasets of sensor data with two or more datasets of the first sensor data, the second sensor data and the on-off duty cycle to predict that a component of the ventilation system is faulty.

9. The computer implemented method of claim 8, further comprising:
accessing outside air temperature data and outside air relative humidity data corresponding to a geographic location in which the ventilation system is operating; and wherein the machine learning includes the outside temperature data and outside air relative humidity data.

10. The computer implemented method of claim 8, wherein the component is at least one of:
a compressor,
a blower,
a refrigerant charge;
a drain line float switch
a filter, and
a heating element.

11. A system for remote performance monitoring of a ventilation system, the system comprising:
a computer memory capable of storing machine instructions; and
a hardware processor in communication with the computer memory, the hardware processor configured to access the computer memory to execute the machine instructions to perform
accessing first sensor data from a first sensor placed on a return air grill for measuring a return temperature and a return humidity of air going into a return of the ventilation system for heating, cooling or a combination thereof;
accessing second sensor data from a second sensor placed on a supply air grill for measuring a supply temperature and a supply humidity of air coming out of the ventilation system;
using data from the first sensor and data from the second sensor to determine an on-off duty cycle of an
on-time period during which the ventilation system is operating to change a temperature, humidity, or combination thereof, between the air as measured by the first sensor on the return air grill and the air as measured by the second sensor on the supply air grill, and
off-time period during which the ventilation system is not operating to change a temperature, humidity, or combination thereof, between the air as measured by the first sensor on the return air grill and the air as measured by the second sensor on the supply air grill; and
using machine learning with two or more datasets of the first sensor data, the second sensor data and the on-off duty cycle to indicating a component of the ventilation system is faulty.

12. The system of claim 11, wherein the using data from the first sensor and data from the second sensor to determine an on-off duty cycle is carried out independent of data from an electric meter measuring current consumed by the ventilation system.

13. The system of claim 11, wherein the using data from the first sensor and data from the second sensor to determine an on-off duty cycle is carried out independent of data from a ventilation thermostat which controls the ventilation system.

14. The system of claim 11, further comprising:
accessing outside air temperature data and outside air relative humidity corresponding to a geographic location in which the ventilation system is operating; and wherein the using machine learning with two or more datasets of the first sensor data, the second sensor data and the on-off duty cycle includes the outside air temperature data and the outside air relative humidity data.

15. The system of claim 11, further comprising:
accessing outside air temperature data and outside air relative humidity data corresponding to a geographic location in which the ventilation system is operating; and wherein the machine learning includes the outside temperature data and outside air relative humidity data.

16. The system of claim 15, wherein the component is at least one of:
a compressor,
a blower,
a refrigerant charge;
a drain line float switch
a filter, and
a heating element.

17. The system of claim 10, further including:
a first wireless temperature and humidity sensor for supplying the first sensor data; and
a second wireless temperature and humidity sensor for supplying the second sensor data.

18. A system for remote performance monitoring of a ventilation system, the system comprising:
a first wireless sensor placed on a return air grill for measuring a return temperature and a return humidity of air going into a return of the ventilation system for heating, cooling or a combination thereof, to provide supply temperature and humidity data to an autonomous fault detection computer system; and
a second wireless sensor placed on a supply air grill for measuring a supply temperature and a supply humidity of air coming out of the ventilation system to provide supply temperature and humidity data to the computer system,
wherein the computer system determines an on-off duty cycle of an
on-time period during which the ventilation system is operating to change a temperature, humidity, or combination thereof, between the air as measured by the first wireless sensor on the return air grill and the air as measured by the second wireless sensor on the supply air grill, and
off-time period during which the ventilation system is not operating to change a temperature, humidity, or combination thereof, between the air as measured by the first wireless sensor on the return air grill and the air as measured by the second wireless sensor on the supply air grill; and using machine learning with two or more datasets of the data from the first wireless sensor, data from the second wireless sensor, and the on-off duty cycle to predict a component of the ventilation system is faulty.

19. The system of claim 18, wherein the using data from the first wireless sensor and data from the second wireless sensor to determine an on-off duty cycle is carried out independent of data from an electric meter measuring current consumed by the ventilation system.

20. The system of claim 19, wherein the using data from the first wireless sensor and data from the second wireless sensor to determine an on-off duty cycle is carried out independent of data from a ventilation thermostat which controls the ventilation system.

* * * * *